(12) United States Patent
Lei et al.

(10) Patent No.: US 10,133,902 B2
(45) Date of Patent: Nov. 20, 2018

(54) BARCODE READER

(71) Applicant: The Code Corporation, Draper, UT (US)

(72) Inventors: Ming Lei, Princeton Junction, NJ (US); Mark Ashby, Taylorsville, UT (US); Ryan Hoobler, Salt Lake City, UT (US)

(73) Assignee: The Code Corporation, Draper, UT (US)

( * ) Notice: Subject to any disclaimer, the term of this patent is extended or adjusted under 35 U.S.C. 154(b) by 36 days.

(21) Appl. No.: 14/717,112

(22) Filed: May 20, 2015

(65) Prior Publication Data

US 2016/0321487 A1 Nov. 3, 2016

Related U.S. Application Data

(60) Provisional application No. 62/154,066, filed on Apr. 28, 2015.

(51) Int. Cl.
*G06K 7/10* (2006.01)
*G06K 7/14* (2006.01)

(52) U.S. Cl.
CPC ......... *G06K 7/146* (2013.01); *G06K 7/10722* (2013.01); *G06K 7/10732* (2013.01); *G06K 7/10752* (2013.01); *G06K 7/10792* (2013.01); *G06K 7/10851* (2013.01); *G06K 7/1465* (2013.01)

(58) Field of Classification Search
CPC ..................... G06T 5/003; G06T 17/00; G06T 2207/20201; G06T 2207/30108; G06T 2210/41; G06T 3/4023; G06T 7/001; A47F 9/047; A61N 2005/1061; A61N 5/1049; G06K 7/10; G06K 7/10722; G06K 9/4609; G06K 9/6211
USPC .................................................... 235/462.06
See application file for complete search history.

(56) References Cited

U.S. PATENT DOCUMENTS

| | | | | |
|---|---|---|---|---|
| 2007/0110333 | A1* | 5/2007 | Kondo | G06K 9/4609 382/276 |
| 2009/0060259 | A1* | 3/2009 | Goncalves | A47F 9/047 382/100 |
| 2009/0277962 | A1* | 11/2009 | McCloskey | G06K 7/10 235/462.01 |
| 2013/0121551 | A1* | 5/2013 | Poulsen | G06T 17/00 382/131 |
| 2016/0034913 | A1* | 2/2016 | Zavarehi | G06Q 30/0185 235/462.25 |

* cited by examiner

*Primary Examiner* — Thien M Le
*Assistant Examiner* — Tae Kim
(74) *Attorney, Agent, or Firm* — Timothy P. O'Hagan; Ray Quinney & Nebeker

(57) ABSTRACT

A barcode reader may perform image processing functions to generate distinct image data records from the frame of image data of a barcode, select an image data record from the distinct image data records and decode the selected image data record. Each image data record may be generated by applying a distinct image processing function to the frame of image data. The barcode reader may capture multiple frames of image data in sequence based on image capture parameters. At least one of the multiple frames of image data may be captured with a distinct parameter value. The image capture parameters may include an exposure setting, a gain setting, a resolution setting, and/or an illumination setting.

27 Claims, 19 Drawing Sheets

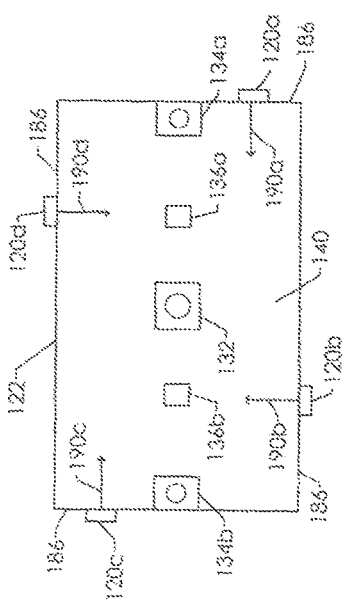
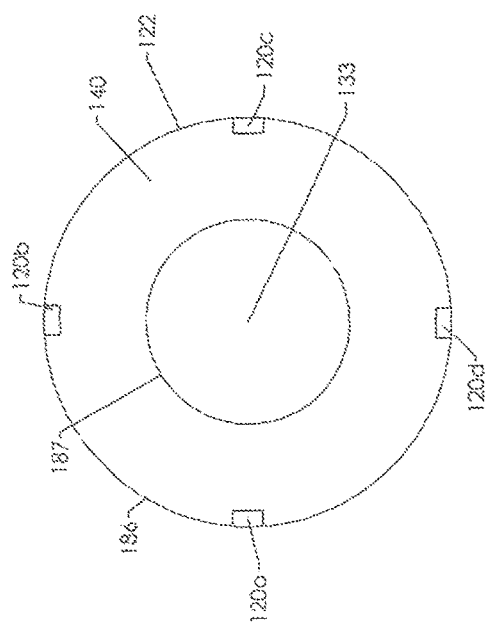

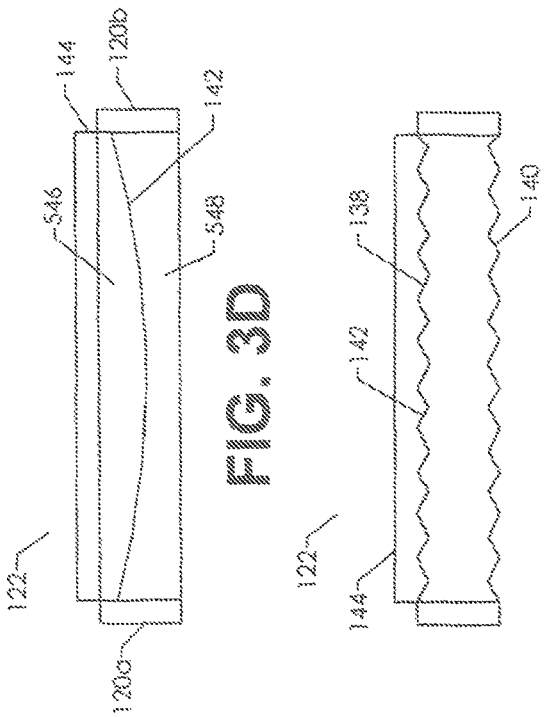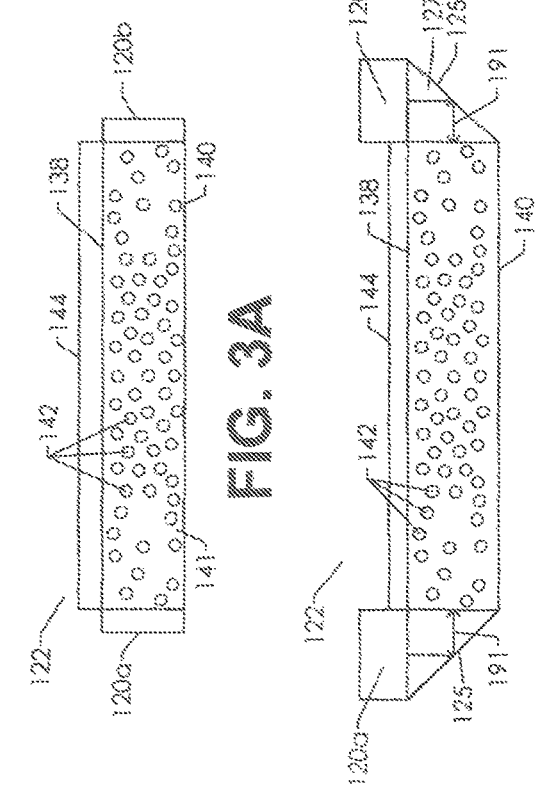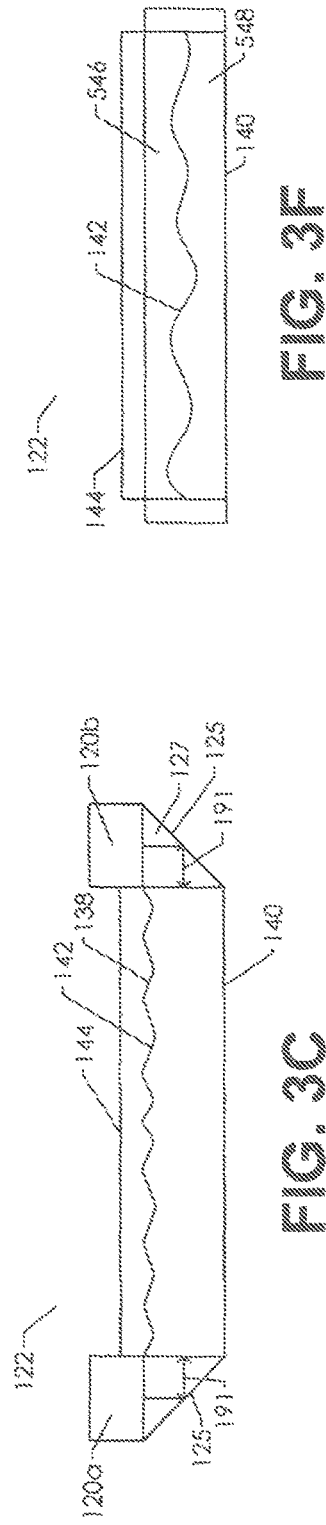

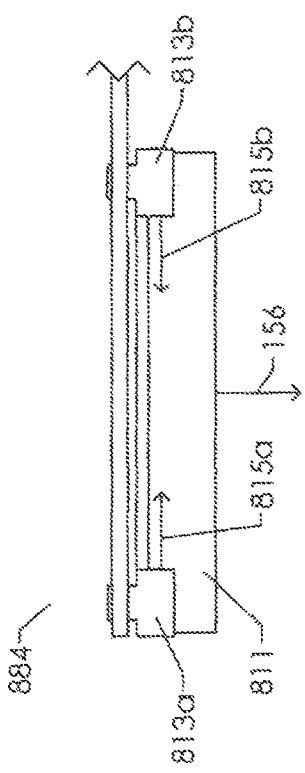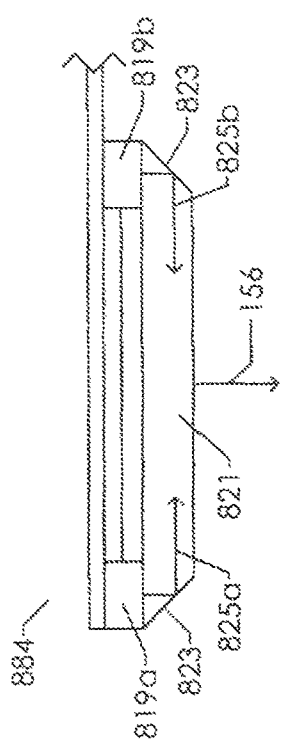

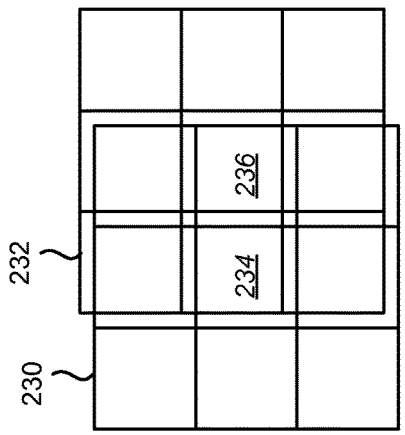
FIG. 12B
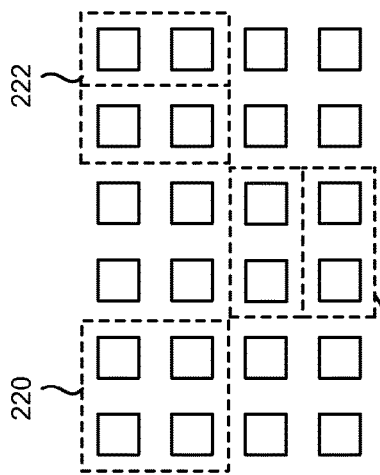
FIG. 12A
FIG. 12C

FIG. 13A

| Image Frame 1 Exposure = X | Image Frame 2 Exposure = Y | Image Frame 3 Exposure = Z |

FIG. 13B

| Image Frame 1 Illumination 930a–ON Exposure = A | Image Frame 2 Illumination 930a–ON Exposure = B | Image Frame 3 Illumination 930b–ON Exposure = C | Image Frame 4 Illumination 930b–ON Exposure = D |

| Exemplary Derivatives of a Frame of Image Data Produced by Permutations of Preprocessing Circuits or an Image Processing Module |
|---|
| Full Frame |
| Binning of a Full Frame or a Window of a Full Frame (Average Digital Values) |
| Sub-Sample of a Full Frame for a Window of a Full Frame |
| Rotation of Full Frame, a Window of a Full Frame or Binned Full Frame or Window of a Full Frame. (All Columns or Sub-Sampled Selected Columns/Rows) |
| Convolution of Full Frame, a Window of a Full Frame, a Binned Full Frame or Window of a Full Frame, or a Sub-Sampled Full Frame of Window of a Full Frame (Selected One of Multiple Kernels) |
| Double Convolution of Full Frame, a Window of a Full Frame, a Binned Full Frame or Window of a Full Frame, or a Sub-Sampled Full Frame of Window of a Full Frame (Two Distinct Kernels Applied Sequentially) |

FIG. 14

BARCODE READER

CLAIM OF PRIORITY

This application claims the benefit of U.S. Provisional Patent Application No. 62/154,066, titled "Barcode Reader," filed Apr. 28, 2015, with inventors Ming Lei, Mark Ashby and Ryan Hoobler, which is incorporated herein by reference as if fully set forth.

TECHNICAL FIELD

The present disclosure relates generally to a barcode reader. More specifically, the present disclosure relates to a barcode reader that includes multiple illumination systems and multiple sets of imaging optics.

BACKGROUND

A barcode is an optical machine-readable representation of information. Devices for identifying or extracting information from barcodes are generally referred to as barcode readers (or barcode scanners). An image-based barcode reader includes a camera for capturing an image of a barcode to be read. The camera includes a focusing lens that focuses light reflected from a target area onto a photo sensor array. Once an image of a barcode has been captured by the camera, a decoder processes the image and extracts the information contained in the barcode.

SUMMARY

According to one embodiment, there is provided a barcode reader, comprising a lens for focusing an image of a barcode onto a two-dimensional array of photosensitive diodes; image read-out circuitry coupled to the two-dimensional array of photosensitive diodes and configured to generate a frame of image data, wherein the frame of image data is a sequence of values, each value representing the intensity of illumination focused onto one of the photosensitive diodes; an image processing circuit configured to receive the sequence of values of the frame of image data and perform image processing functions to generate at least two distinct image data records from the frame of image data; non-transient computer readable media for storing the at least two distinct image data records; and a processor configured to select an image data record from the at least two distinct image data records and decode the selected image data record.

Each of the at least two image data records may be a derivative of the frame of image data. Each of the at least two image data records may be generated by applying one of at least two distinct image processing convolution kernels to at least two of: i) the frame of image data; ii) a reduced resolution image resulting from reducing resolution of the frame of image data by sub-sampling or binning; and iii) a convolution of the frame of image data generated by applying a first convolution kernel, different than the at least two distinct image processing convolution kernels, to the frame of image data.

Each of the at least two image data records may be generated by applying a second convolution kernel to at least two of: i) the frame of image data; ii) a reduced resolution image resulting from reducing resolution of the frame of image data by sub-sampling or binning; and iii) a convolution of the frame of image data generated by applying a first different convolution kernel, different than the second convolution kernel, to the frame of image data.

The processor may be configured to select the image data record for decoding from the at least two distinct image data records by: extracting, from at least one of the image data records, subsets of the image data record; and analyzing each subset of the image data record and selecting a subset with a superior contrast profile, wherein the selected image data record is the image data record from which the selected subset is extracted. The superior contrast profile may mean at least one of: (i) a greater maximum amplitude between portions of an image within a subset that are dark marks of the barcode and portions of the image within the subset that are light marks of the barcode; and (ii) more distinct transitions between the portions of the image within the subset that are dark marks of the barcode and the portions of the image within the subset that are light marks of the barcode.

The non-transient computer readable media further includes an image frame buffer for storing the frame of image data. The image frame buffer may be a portion of the non-transient computer readable media, typically RAM.

The two-dimensional array of photosensitive diodes and the image read-out circuitry may be within a first system package, and the image processing circuit, the non-transient computer readable media, and the processor may be within a second system package. Alternatively, the two-dimensional array of photosensitive diodes, the image read-out circuitry, the image processing circuit, and the non-transient computer readable media may be within a first system package, and the processor may be within a second system package. The processor may be configured to decode the selected image data record by transferring at least a portion of the selected image data record to a second non-transient computer readable medium associated with the second system package. Alternatively, the processor may be configured to decode the selected image data record directly from the non-transient computer readable media in the first system package.

In accordance with another embodiment, there is provided a barcode reader, comprising: a camera system for generating a frame of image data comprising an image of a barcode within a field of view of the camera system; an image processing system for receiving the frame of image data and generating at least two distinct image data records, each of the at least two image data records being a derivative of the frame of image data; non-transient computer readable media for storing the at least two distinct image data records; and a processor configured to select an image data record from the at least two distinct image data records and decode the selected image data record.

Each of the at least two image data records may be generated by applying one of at least two distinct image processing convolution kernels to at least two of: i) the frame of image data; ii) a reduced resolution image resulting from reducing resolution of the frame of image data by sub-sampling or binning; and iii) a convolution of the frame of image data generated by applying a first convolution kernel, different than the at least two distinct image processing convolution kernels, to the frame of image data.

Each of the at least two image data records may be generated by applying a second convolution kernel to at least two of: i) the frame of image data; ii) a reduced resolution image resulting from reducing resolution of the frame of image data by sub-sampling or binning; and iii) a convolution of the frame of image data generated by applying a first different convolution kernel, different than the second convolution kernel, to the frame of image data.

The processor may be configured to select the image data record from the at least two distinct image data records by: extracting, from at least one of the image data records, subsets of the image data record; and analyzing each subset of the image data record and selecting a subset with a superior contrast profile, wherein the selected image data record is the image data record from which the selected subset is extracted. The superior contrast profile may mean at least one of: (i) a greater maximum amplitude between portions of an image within a subset that are dark marks of the barcode and portions of the image within the subset that are light marks of the barcode; and (ii) more distinct transitions between the portions of the image within the subset that are dark marks of the barcode and the portions of the image within the subset that are light marks of the barcode.

The image processing system may include an image frame buffer for storing the frame of image data. The image frame buffer may be a portion of the non-transient computer readable media, typically RAM.

The camera system may be within a first system package, and the image processing system, the non-transient computer readable media, and the processor may be within a second system package. Alternatively, the camera system, the image processing system, and the non-transient computer readable media may be within a first system package, and the processor may be within a second system package. The processor may be configured to decode the selected image data record by transferring at least a portion of the selected image data record to a second non-transient computer readable medium associated with the second system package. Alternatively, the processor may be configured to decode the selected image data record directly from the non-transient computer readable media in the first system package.

In accordance with another embodiment, there is provided a method of reading a barcode with a barcode reader, the method comprising: capturing a frame of image data, the frame of image data comprising an image of a barcode within a field of view of a camera system of a barcode reader; generating at least two distinct image data records from the frame of image data; storing the at least two distinct image data records in non-transient computer readable media; selecting a selected image data record from the at least two distinct image data records; and decoding the selected image record.

Each of the at least two distinct image data records may be generated by applying one of at least two distinct image processing convolution kernels to at least two of: i) the frame of image data; ii) a reduced resolution image resulting from reducing resolution of the frame of image data by sub-sampling or binning; and iii) a convolution of the frame of image data generated by applying a first convolution kernel, different than the at least two distinct image processing convolution kernels, to the frame of image data.

Each of the at least two distinct image data records may be generated by applying a second convolution kernel to at least two of: i) the frame of image data; ii) a reduced resolution image resulting from reducing resolution of the frame of image data by sub-sampling or binning and iii) a convolution of the frame of image data generated by applying a first different convolution kernel, different than the second convolution kernel, to the frame of image data.

The selected image data record may be selected from the at least two distinct image data records by: extracting, from at least one of the image data records, subsets of the image data record; and analyzing each subset of the image data record and selecting a subset with a superior contrast profile, wherein the selected image data record is the image data record from which the selected subset is extracted.

The superior contrast profile may mean at least one of: (i) a greater maximum amplitude between portions of an image within a subset that are dark marks of the barcode and portions of the image within the subset that are light marks of the barcode; and (ii) more distinct transitions between the portions of the image within the subset that are dark marks of the barcode and the portions of the image within the subset that are light marks of the barcode.

In accordance with another embodiment, there is provided a barcode reader, comprising: a lens for focusing an image of a barcode onto a two-dimensional photo sensor array; an image capture system configured to receive image capture parameters and capturing multiple frames of image data in sequence, each captured with image capture settings determined in accordance with the image capture parameters, wherein at least one of the multiple frames of image data is captured with an image capture setting set to a distinct value different from the value of the image capture setting for at least one other frame of image data; and a processor configured to select an image data record from the multiple frames of image data and decode the selected image data record.

The image capture parameters may include at least one of an exposure setting value, a gain setting value, a resolution setting value, and an illumination setting value. The illumination setting value may identify which illumination subsystems are to be activated for capturing a frame of image data and an intensity level of the activated illumination sub-system. The processor may be configured to receive a flash signal from the image capture system indicating a start of each exposure period and an end of each exposure period, and control illumination of the barcode based on the flash signal.

The barcode reader may include an image processing circuit configured to receive the frames of image data and perform image processing functions to generate at least two distinct image data records from a single frame of image data, wherein the image capture parameters indicate which image processing function is to be applied to each of the frames of image data. Each of the at least two image data records may be a derivative of the frame of image data.

Each of the at least two distinct image data records may be generated by applying one of at least two distinct image processing convolution kernels to at least two of: i) the frame of image data; ii) a reduced resolution image resulting from reducing resolution of the frame of image data by sub-sampling or binning; and iii) a convolution of the frame of image data generated by applying a first convolution kernel, different than the at least two distinct image processing convolution kernels, to the frame of image data.

Each of the at least two distinct image data records may be generated by applying a second convolution kernel to at least two of: i) the frame of image data; ii) a reduced resolution image resulting from reducing resolution of the frame of image data by sub-sampling or binning and iii) a convolution of the frame of image data generated by applying a first different convolution kernel, different than the second convolution kernel, to the frame of image data.

The processor may be configured to select the image data record from the at least two distinct image data records by: extracting, from at least one of the image data records, subsets of the image data record; and analyzing each subset of the image data record and selecting a subset with a superior contrast profile, wherein the selected image data record is the image data record from which the selected subset is extracted. The superior contrast profile may mean at least one of: (i) a greater maximum amplitude between portions of an image within a subset that are dark marks of the barcode and portions of the image within the subset that are light marks of the barcode; and (ii) more distinct transitions between the portions of the image within the subset that are dark marks of the barcode and the portions of the image within the subset that are light marks of the barcode.

In accordance with another embodiment, there is provided a barcode reader, comprising: a camera system configured to capture a sequence of frames of image data, each comprising an image of a barcode within a field of view of the camera system; an illumination system including a plurality of illumination sub-systems for illuminating the field of view of the camera system; and a processor coupled to the camera system and configured to generate image capture parameter values for each frame of the sequence of frames of image data and provide the image capture parameter values to the camera system, wherein the image capture parameter values define a quantity of frames of image data to be captured in the sequence and, for each frame, image capture settings, wherein the image capture setting for at least one frame of image data is distinct from the image capture setting for at least one other frame of image data within the sequence.

The parameters may include at least one of an exposure setting value, a gain setting value, a resolution setting value, and an illumination setting value. The illumination setting value may identify which illumination sub-systems are to be activated for capturing a frame of image data and an intensity level of the activated illumination sub-system. The processor may be configured to receive a flash signal from the image capture system indicating a start of each exposure period and an end of each exposure period, and control illumination of the barcode based on the flash signal.

The barcode reader may include an image processing circuit configured to receive the sequence of frames of image data and perform image processing functions to generate at least two distinct image data records from a frame of image data, wherein the processor is configured to select an image data record from the distinct image data records and decode the selected image data record, wherein the parameters indicate which image processing function is to be applied to each of the frames of image data. Each of the at least two distinct image data records may be a derivative of the frame of image data.

Each of the at least two image data records may be generated by applying one of at least two distinct image processing convolution kernels to at least two of: i) the frame of image data; ii) a reduced resolution image resulting from reducing resolution of the frame of image data by sub-sampling or binning; and iii) a convolution of the frame of image data generated by applying a first convolution kernel, different than the at least two distinct image processing convolution kernels, to the frame of image data.

Each of the at least two image data records may be generated by applying a second convolution kernel to at least two of: i) the frame of image data; ii) a reduced resolution image resulting from reducing resolution of the frame of image data by sub-sampling or binning; and iii) a convolution of the frame of image data generated by applying a first different convolution kernel, different than the second convolution kernel, to the frame of image data.

The processor may be configured to select the image data record from the at least two distinct image data records by: extracting, from at least one of the image data records, subsets of the image data record; and analyzing each subset of the image data record and selecting a subset with a superior contrast profile, wherein the selected image data record is the image data record from which the selected subset is extracted. The superior contrast profile may mean at least one of: (i) a greater maximum amplitude between portions of an image within a subset that are dark marks of the barcode and portions of the image within the subset that are light marks of the barcode; and (ii) more distinct transitions between the portions of the image within the subset that are dark marks of the barcode and the portions of the image within the subset that are light marks of the barcode.

In accordance with another embodiment, there is provided a method for reading a barcode, the method comprising: generating image capture parameter values for each frame of image data within a sequence of frames of image data, wherein the image capture parameter values define a quantity of frames of image data to be captured in the sequence and image capture settings for each frame of the image data in the sequence, wherein an image capture setting for at least one frame of image data is distinct from the image capture setting for at least one other frame of image data within the sequence; providing the image capture parameter values to a camera system; capturing a sequence of frames of image data in accordance with the image capture parameter values; storing the sequence of frames of image data in a buffer memory; selecting a frame of image data from the sequence of frames and decoding the selected frame of image data.

The image capture parameters may include at least one of an exposure setting value, a gain setting value, a resolution setting value, and an illumination setting value. The illumination setting value may identify which illumination subsystems are to be activated for capturing at least one of the frames of image data within the sequence and an intensity level of the activated illumination sub-system.

The method may further comprise receiving a flash signal from an image capture system indicating a start of each exposure period and an end of each exposure period; and controlling illumination of a barcode based on the flash signal.

The method may further comprise performing image processing functions on at least one frame of the sequence of frames of image data to generate at least two distinct image data records from a single frame of image data, wherein the parameters indicate which image processing function is to be applied to each of the frames of image data. Each of the at least two image data records may be a derivative of the frame of image data.

Each of the at least two image data records may be generated by applying one of at least two distinct image processing convolution kernels to at least two of: i) the frame of image data; ii) a reduced resolution image resulting from reducing resolution of the frame of image data by sub-sampling or binning; and iii) a convolution of the frame of image data generated by applying a first convolution kernel, different than the at least two distinct image processing convolution kernels, to the frame of image data.

Each of the at least two image data records may be generated by applying a second convolution kernel to at least two of: i) the frame of image data; ii) a reduced resolution image resulting from reducing resolution of the frame of image data by sub-sampling or binning; and iii) a convolution of the frame of image data generated by applying a first different convolution kernel, different than the second convolution kernel, to the frame of image data.

The method may further comprise extracting, from at least one of the image data records, subsets of the image data record; and analyzing each subset of the image data record and selecting a subset with a superior contrast profile, wherein the selected image data record is the image data record from which the selected subset is extracted. The superior contrast profile may mean at least one of: (i) a greater maximum amplitude between portions of an image within a subset that are dark marks of the barcode and portions of the image within the subset that are light marks of the barcode; and (ii) more distinct transitions between the portions of the image within the subset that are dark marks of the barcode and the portions of the image within the subset that are light marks of the barcode.

In accordance with another embodiment, there is provided a barcode reader, comprising: an optic system for focusing an image of a barcode onto an image sensor array, wherein the image sensor array comprises a plurality of rows of pixels, and each pixel comprises an active photosensitive region which accumulates charge over a duration of an exposure period; image read-out circuitry configured to: sequentially commence exposure for each row of pixels from a first row to a last row of the image sensor array, each row of pixels being exposed during an exposure period between an exposure start time for the row and an exposure end time for the row; and for each row of pixels, at the exposure end time of the row, measure, and transfer either to pre-processing circuits or to memory, digital values representative of the intensity of illumination accumulated on each pixel within the row during the exposure period, wherein a time period exists during which the exposure start time has commenced for all rows and the exposure end time has not yet been reached for any row; and a processor configured to decode the barcode represented by the digital values stored in the memory.

A wide bus may be used to transfer the digital values for an entire row of pixels to the pre-processing circuits or to the memory in parallel. The wide bus may be as wide as the number of columns of pixels in the image sensor array.

A bank of analog-to-digital (A/D) converters may be used to generate the digital values for each of the plurality of rows of pixels. Alternatively, multiple (N) banks of analog-to-digital (A/D) converters may be used to generate the digital values such that each bank of A/D converters generates the digital values for every N row of pixels.

The pre-processing circuits may be configured to receive a frame of image data and perform image processing functions to generate distinct image data records from the frame of image data. Each of the at least two image data records may be a derivative of the frame of image data.

Each of the image data records may be generated by applying one of at least two distinct image processing convolution kernels to at least two of: i) the frame of image data; ii) a reduced resolution image resulting from reducing resolution of the frame of image data by sub-sampling or binning; and iii) a convolution of the frame of image data generated by applying a first convolution kernel, different than the at least two distinct image processing convolution kernels, to the frame of image data.

Each of the image data records may be generated by applying a second convolution kernel to at least two of: i) the frame of image data; ii) a reduced resolution image resulting from reducing resolution of the frame of image data by sub-sampling or binning; and iii) a convolution of the frame of image data generated by applying a first different convolution kernel, different than the second convolution kernel, to the frame of image data.

In accordance with another embodiment, there is provided a barcode reader, comprising: a lens for focusing an image of a barcode onto an image sensor array, wherein the image sensor array comprises a plurality of rows of pixels, each pixel comprising an active photosensitive region which accumulates charge over a duration of an exposure period; image read-out circuitry configured to: sequentially commence exposure for each row of pixels from a first row to a last row of the image sensor array, each row of pixels being exposed during an exposure period between an exposure start time for the row and an exposure end time for the row; and for each row of pixels, at the exposure end time, measure, and transfer to one of pre-processing circuits or non-transient computer readable media, digital values representative of the intensity of illumination accumulated on each pixel within the row during the exposure period, wherein a total exposure period for the image sensor array for one frame of image data includes: i) a first period being a time between an exposure start time for the first row and an exposure start time for the last row; ii) a second period being a time when all rows are being simultaneously exposed; and iii) a third period being a time between an exposure end time for the first row and an exposure end time for the last row; and a processor configured to decode the barcode represented by the digital values stored in the non-transient computer readable media.

A wide bus may be used to transfer the digital values for an entire row of pixels to the pre-processing circuits or to the memory in parallel. The wide bus may be as wide as the number of columns of pixels in the image sensor array. A bank of analog-to-digital (A/D) converters may be used to generate the digital values for each of the plurality of rows of pixels. Alternatively, multiple (N) banks of analog-to-digital (A/D) converters may be used to generate the digital values such that each bank of A/D converters generates the digital values for every N row of pixels.

The pre-processing circuits may be configured to receive a frame of image data and perform image processing functions to generate distinct image data records from the frame of image data. Each of the at least two image data records may be a derivative of the frame of image data.

Each of the image data records may be generated by applying one of at least two distinct image processing kernels to at least two of: i) the frame of image data; ii) a reduced resolution image resulting from reducing resolution of the frame of image data by sub-sampling or binning; and iii) a convolution of the frame of image data generated by applying a first convolution kernel, different than the at least two distinct image processing convolution kernels, to the frame of image data.

Each of the image data records may be generated by applying a second convolution kernel to at least two of: i) the frame of image data; ii) a reduced resolution image resulting from reducing resolution of the frame of image data by sub-sampling or binning; and iii) a convolution of the frame of image data generated by applying a first different convolution kernel, different than the second convolution kernel, to the frame of image data.

In accordance with another embodiment, there is provided a method of operating a barcode reader, the method comprising: focusing an image of a barcode onto an image sensor array, wherein the image sensor array comprises a plurality of rows of pixels, and each pixel comprises an active photosensitive region which accumulates charge over a duration of an exposure period; commencing exposure sequentially for each row of pixels of the image sensor array from a first row to a last row, wherein each row of pixels is exposed during an exposure period between an exposure start time for the row and an exposure end time for the row; measuring, for each row of pixels at an exposure end time of the row, digital values representative of the intensity of illumination accumulated on each pixel within the row during the exposure period, wherein a time period exists during which the exposure start time has commenced for all rows and the exposure end time has not yet been reached for any row; transferring the digital values to one of pre-processing circuits or memory; and decoding the barcode represented by the digital values stored in the memory.

A wide bus may be used to transfer the digital values for an entire row to the pre-processing circuits or to the memory in parallel. The wide bus may be as wide as the number of columns of pixels in the image sensor array. A bank of A/D converters may be used to generate the digital values for each of the plurality of rows of pixels. Alternatively, multiple (N) banks of A/D converters may be used to generate the digital values such that each bank of A/D converters generates the digital values for every N row of pixels.

The pre-processing circuits may be configured to receive a frame of image data and perform image processing functions to generate distinct image data records from the frame of image data. Each of the at least two image data records may be a derivative of the frame of image data.

Each of the image data records may be generated by applying one of at least two distinct image processing convolution kernels to at least two of: i) the frame of image data; ii) a reduced resolution image resulting from reducing resolution of the frame of image data by sub-sampling or binning; and iii) a convolution of the frame of image data generated by applying a first convolution kernel, different than the at least two distinct image processing convolution kernels, to the frame of image data.

Each of the image data records may be generated by applying a second convolution kernel to at least two of: i) the frame of image data; ii) a reduced resolution image resulting from reducing resolution of the frame of image data by sub-sampling or binning; and iii) a convolution of the frame of image data generated by applying a first different convolution kernel, different than the second convolution kernel, to the frame of image data.

In accordance with another embodiment, there is provided a barcode reader, comprising: a lens for focusing an image of a barcode onto an image sensor array, wherein the image sensor array comprises a plurality of rows of pixels, and each pixel comprises an active photosensitive region which accumulates charge over a duration of an exposure period; a first circuitry configured to: sequentially commence exposure for each row of pixels from a first row to a last row of the image sensor array, wherein each row of pixels is exposed for an exposure period commencing at an exposure start time for the row and ending at an exposure end time for the row; and for each row of pixels, at the exposure end time, measure, and transfer to a first memory at a first read-out speed, digital values representative of the intensity of illumination accumulated on each pixel within the row during the exposure period; a second circuitry configured to transfer the digital values from the first memory to a second memory at a second read-out speed, wherein the second row read-out speed is slower than the first row read-out speed; and a processor configured to decode the barcode represented by the digital values stored in the second memory.

The first memory may be large enough to hold an entire frame of image data, and the digital values are read-out of the first memory after the entire frame of image data is put into the first memory.

The first circuitry may be configured to receive image capture parameter value and capture multiple frames of image data in sequence based on the image capture parameter values, wherein at least one of the multiple frames of image data is captured with an image capture setting set to an image capture parameter value that is distinct from the image capture setting for at least one other frame of image data. The image capture parameters include at least one of an exposure setting value, a gain setting value, a resolution setting value, and an illumination setting value. A subset of the multiple frames of image data may be transferred to the second memory. The first circuitry and the first memory may be within a first system package, and the processor and the second memory may be within a second system package.

In accordance with another embodiment, there is provided a barcode reader, comprising: a lens for focusing an image of a barcode onto an image sensor array, wherein the image sensor array comprises a plurality of rows of pixels and each pixel comprises an active photosensitive region which accumulates charge over a duration of an exposure period; a first circuitry configured to sequentially read-out rows of pixels from a first row to a last row at a first read-out speed, and store one of a frame of image data or a derivative of the frame of image data in a first memory; a second circuitry configured to transfer one of the frame of image data or the derivative of the frame of image data to a second memory at a second read-out speed, wherein the second row read-out speed is slower than the first row read-out speed; and a processor configured to decode the frame of image data or the derivative of the frame of image data stored in the second memory.

The first memory may be large enough to hold an entire frame of image data. The frame of image data may be read-out of the first memory after the entire frame of image data is put into the first memory.

The first circuitry may be configured to receive image capture parameter values and capture multiple frames of image data in sequence based on the image capture parameter values, wherein at least one of the multiple frames of image data is captured using an image capture setting set to an image capture parameter value that is distinct from the image capture setting for at least one other frame of image data. The image capture parameters include at least one of an exposure setting value, a gain setting value, a resolution setting value, and an illumination setting value. A subset of fewer than all of the multiple frames of image data may be transferred to the second memory. The first circuitry and the first memory may be within a first system package, and the processor and the second memory may be within a second system package.

In accordance with another embodiment, there is provided a method of operating a barcode reader, the method comprising: focusing an image of a barcode onto an image sensor array, wherein the image sensor array comprises a plurality of rows of pixels, and each pixel comprises an active photosensitive region which accumulates charge over a duration of an exposure period; commencing exposure sequentially for each row of pixels of the image sensor array from a first row to a last row; reading out rows of pixels sequentially from the first row to the last row at a first read-out speed, and storing one of a frame of image data or a derivative of the frame of image data in a first memory; transferring the one of the frame of image data or the derivative of the frame of image data to a second memory at a second read-out speed, wherein the second row read-out speed is slower than the first row read-out speed; and decoding the one of the frame of image data or the derivative of the frame of image data stored in the second memory.

The first memory may be large enough to hold an entire frame of image data. The frame of image data may be read-out of the first memory and transferred to the second memory after the entire frame of image data is put into the first memory.

The method may further comprise receiving image capture parameter values; and capturing multiple frames of image data in sequence based on the image capture parameters, wherein at least one of the multiple frames of image data is captured with an image capture setting set to an image capture parameter value distinct from the image capture setting for at least one other frame of image data. The image capture parameters include at least one of an exposure setting value, a gain setting value, a resolution setting value, and an illumination setting value. A subset of the multiple frames of image data is transferred to the second memory.

A number of features are described herein with respect to embodiments of the invention. It will be appreciated that features described with respect to a given embodiment also may be employed in connection with other embodiments.

The invention includes the features described herein, including the description, the annexed drawings, and, if appended, the claims, which set forth in detail certain illustrative embodiments. These embodiments are indicative, however, of but a few of the various ways in which the principles of the invention may be employed.

BRIEF DESCRIPTION OF THE DRAWINGS

FIGS. 2A-2E are front views of an optical substrate within the barcode reader shown in FIG. 1 in accordance with different embodiments of the present disclosure.

FIGS. 3A-3F illustrate cross-sectional views of the optical substrate, taken along the line A-A in FIGS. 2A-2C in accordance with different embodiments of the present disclosure.

FIGS. 8A-8B are cross-sectional views of tertiary light sources illuminating the optical substrate in accordance with some embodiments of the present disclosure.

FIGS. 12A-12D show examples of pre-processing in accordance with some embodiments of the present disclosure.

FIGS. 13A and 13B show examples of a frame of image data generated with different settings in accordance with embodiments of the present disclosure.

FIG. 14 shows exemplary derivatives of a frame of image data produced by permutations of pre-processing circuits and/or an image processing module.

DETAILED DESCRIPTION

Figure 1:
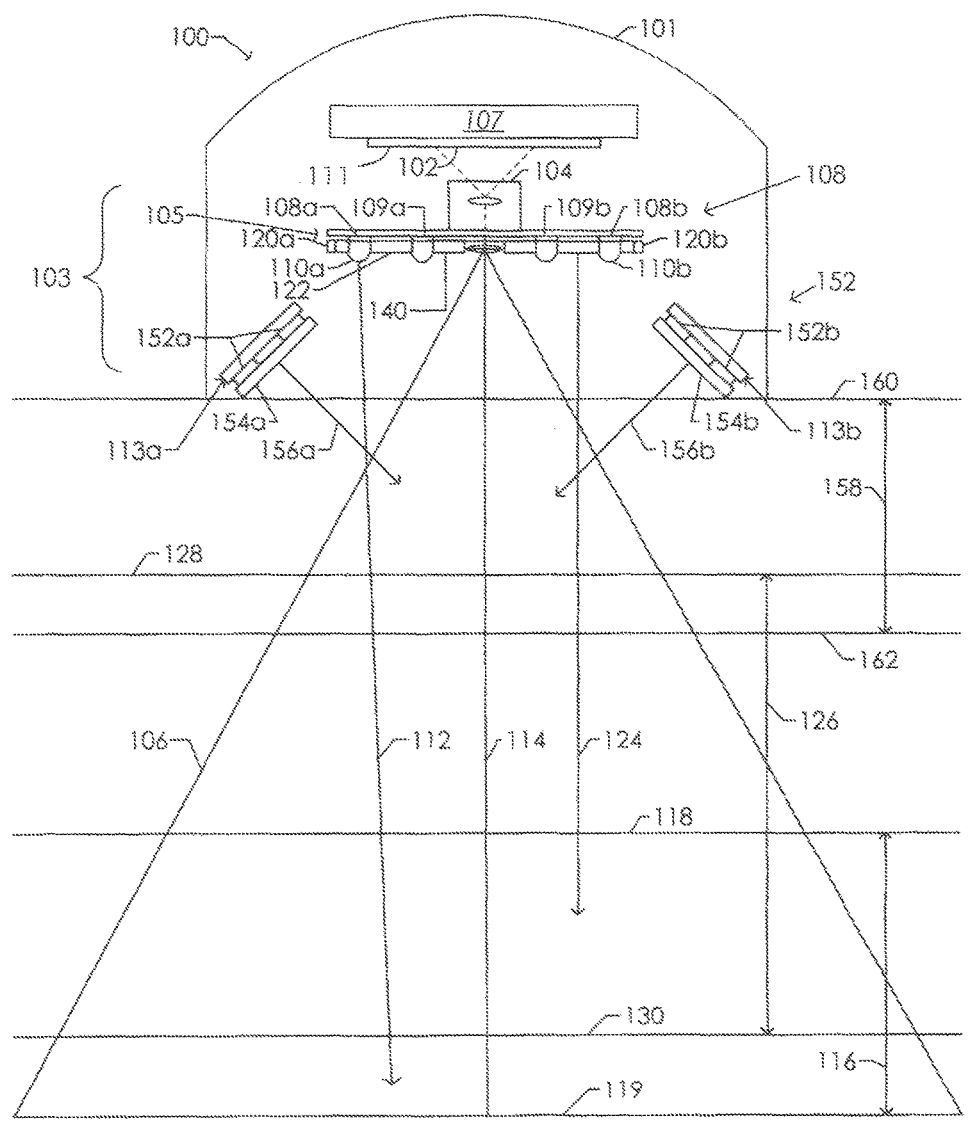
FIG. 1 is a top-down view of a barcode reader in accordance with one embodiment of the present disclosure.

FIG. 1 is a top-down view of an exemplary barcode reader 100 in accordance with one embodiment of the present disclosure. The barcode reader 100 includes a housing 101, a photo sensor array 102 (i.e., an image sensor array), an optic system 104 for focusing an image of a barcode (not shown) within a field of view 106 onto the photo sensor array 102, an image sensor system package 111, an image capture control and decode system 107, and an illumination system 103. The image sensor system package 111 captures an image of the barcode focused onto the photo sensor array 102. The image capture control and decode system 107 controls: i) the illumination system 103; ii) the image sensor system package 111; and iii) decoding of the captured image. A more detailed discussion of the image sensor system package 111 and the image capture control and decode system 107 is included herein.

The field of view 106 imaged by the optic system 104 onto the photo sensor array 102 is directed along an optical axis 114 perpendicular to a plane of the photo sensor array 102 and extends though the optic system 104. The optic system 104 may be located near a center of the photo sensor array 102 (in both the vertical and horizontal dimensions) such that the optical axis 114 is centered on the photo sensor array 102.

The optic system 104 may comprise a single lens or series of lenses capable of focusing: i) illumination reflected from objects within the field of view 106 such as a barcode printed or otherwise marked on a substrate; and ii) illumination emitted from objects within the field of view 106 such as a barcode rendered on a back-lit display screen. In each case, the illumination is focused onto the photo sensor array 102.

The illumination system 103 is configured to illuminate the barcode within the field of view 106 during image capture. The illumination system 103 may include multiple illuminating sub-systems such as a direct bright field illumination sub-system 108 (which may also be referred to as a far field illumination sub-system), a diffuse bright field illumination sub-system 105 (which may also be referred to as a mid-range illumination sub-system), and a dark field illumination sub-system 152 (which may also be referred to as a close-range illumination sub-system).

The direct bright field illumination sub-system (i.e., a far field illumination sub-system) 108 may comprise one or more light sources 108a-b, each of which may be a light-emitting diode (LED) light source. In one embodiment, each of the one or more light sources 108a-b may be a red LED with illumination of approximately 650 nm. Light from the one or more light sources 108a-b may emit direct illumination 112 into the field of view 106 substantially parallel to the optical axis 114 but with a slight convergence angle. For example, the one or more light sources 108a-b may emit direct illumination into the field of view 106 at an angle from 0-30 degrees from the optical axis 114. As indicated above, the optical axis 114 is a line perpendicular to the photo sensor array 102 and originating therefrom through the center of the optic system 104 (e.g., a focusing lens) and extending outward into the center of the field of view 106.

Light emitted by the direct bright field illumination sub-system 108 may be suited for reading a barcode with a diffuse surface such as a paper label and may be optimal for reading a barcode that is located in an area of the field of view 106 that is relatively far away from the barcode reader 100. Such an area may be referred to as a far zone 116 of the field of view 106. Stated alternatively, the direct illumination 112 from the direct bright field illumination sub-system 108 may have a sufficient intensity to adequately illuminate a barcode that is located within the far zone 116 for imaging by the optic system 104 onto the photo sensor array 102. The far zone 116 may begin at a far zone starting boundary 118 and end at a far zone ending boundary 119. In one implementation, the far zone starting boundary 118 may be located about 75 mm away from the barcode reader 100.

The direct illumination 112 emitted by the direct bright field illumination sub-system 108 may not be sufficiently diffuse to provide optimal illumination for reading a barcode that has a reflective surface or is positioned closer to the barcode reader 100 than to the far zone 116. More specifically, the direct illumination 112 may create bright spots or hotspots when illuminating a barcode with a reflective (non-diffuse) surface or when illuminating a barcode placed closer to the barcode reader 100 than to the far zone 116.

The diffuse bright field illumination sub-system (i.e., the mid-range illumination sub-system) 105 may emit diffuse light optimal for reading a barcode positioned within a close zone 158 and/or a center zone 126 of the field of view 106. The center zone 126 may begin at a center zone starting boundary 128 and end at a center zone ending boundary 130. The center zone starting boundary 128 is closer to the barcode reader 100 than to a far zone starting boundary 118. For example, the center zone starting boundary 128 may be located approximately 25 mm away from the barcode reader 100. The center zone ending boundary 130 may be located within the far zone 116. Thus, the center zone 126 and the far zone 116 may overlap.

The close zone 158 of the field of view 106 may begin at a close zone starting boundary 160 and may end at a close zone ending boundary 162. The close zone starting boundary 160 may be closer to the barcode reader 100 than to the center zone starting boundary 128. The close zone starting boundary 160 may correspond to the face of the barcode reader 100. The close zone ending boundary 162 may be within the center zone 126. Thus, the close zone 158 and the center zone 126 may overlap.

The diffuse bright field illumination sub-system 105 may include at least one light source 120 and an optical substrate 122 including one or more extraction features. The optical substrate 122 has a front major surface 140 and a back major surface 138 arranged generally perpendicular to the optical axis 114. Illumination is introduced from the at least one light source 120 between the front major surface 140 and the back major surface 138 (shown in FIGS. 3A-3F and 4A-4C). The illumination introduced by the at least one light source 120 is transferred by total internal reflection through the optical substrate 122 between the front major surface 140 and the back major surface 138 in a direction transverse to the optical axis 114. For example, in FIG. 1, the light propagates through the optical substrate 122 in a direction generally perpendicular to the optical axis 114.

In an alternative embodiment depicted in the cross sectional views of the optical substrate 122 of FIGS. 3B and 3C, the at least one light source 120 introduces illumination into the optical substrate 122 through the back major surface 138. In this example, the optical substrate 122 has a chamfered edge 125 that reflects light in direction 191 through a total internal reflection towards the optical axis 114.

Figure 2A:
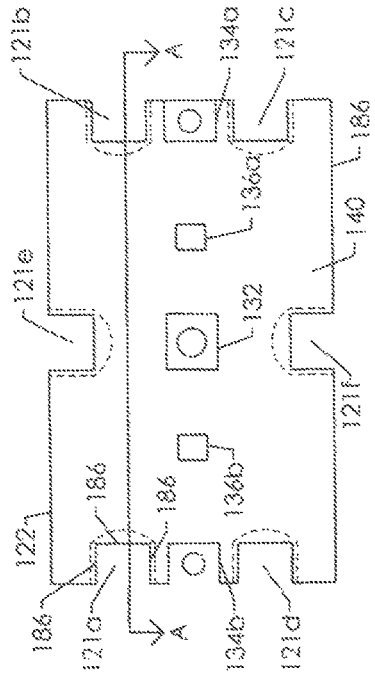

As shown in FIGS. 1, 2A, 3A, and 3D to 3F, the at least one light source 120 may be positioned adjacent an edge 186 of the optical substrate 122. In this configuration, as shown in FIG. 2A, light may exit the at least one light source 120 through a single light-emitting surface (light leaving the light-emitting surface is represented by arrows 190a-d).

Figure 2B:
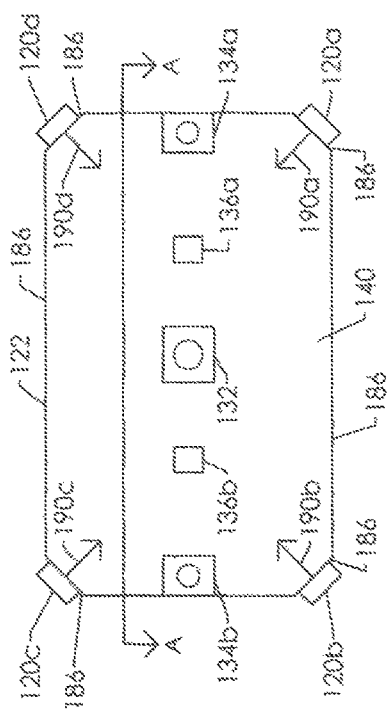

Alternatively, as shown in FIGS. 2B, 3B, and 3C, the at least one light source 120 may be positioned on the back major surface 138 in recesses 121a-f. In this configuration, light (i.e., light leaving the light-emitting surface) may exit the at least one light source 120 through a single light-emitting surface and be reflected from the chamfered edge 125 and directed towards the optical axis in direction 191.

Figure 2C:
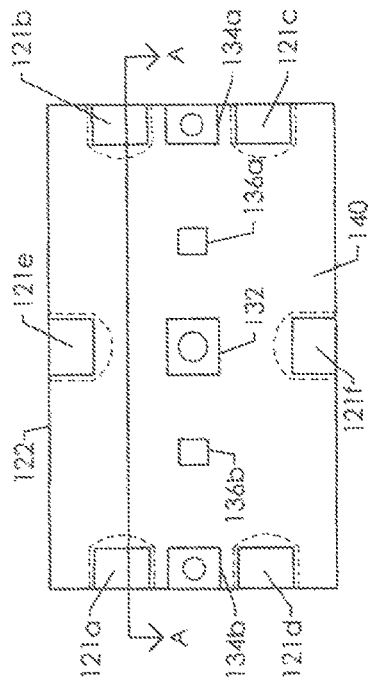

Alternatively, as shown in FIG. 2C, the at least one light source 120 may be positioned within a recess 121 in the optical substrate 122. In this example, the at least one light source 120 may emit light from multiple light-emitting surfaces and the light from all of the light-emitting surfaces may enter the optical substrate 122.

Referring to FIG. 2D, the at least one light source 120 may be reduced to four (4) light sources, each of which is arranged on one exterior edge of the substrate 122 at a location that is not centered on the edge. For example, light source 120a may be on a side edge lower than the center while light source 120c may be on the opposing side higher than the center. Light source 120d may be on the top edge to the right of center while light source 120b may be on the bottom edge to the left of center.

Referring to FIGS. 1 and 2A, the one or more light sources 120 may comprise multiple LEDs. As will be understood by one of ordinary skill in the art, the one or more light sources 120 may comprise any suitable light-emitting device. Further, the multiple light sources 120 may emit illumination with different characteristics. For example, a portion of the light sources 120 may be white LEDs while another portion may be red LEDs, or LEDs of another color.

As shown in FIG. 1, the optical substrate 122 may comprise a substantially flat plate. For example, the optical substrate 122 may comprise a clear and colorless acrylic substrate which may be made from any other material suitable for transferring light by total internal reflection. The optical substrate 122 may be positioned within the barcode reader 100 so that a front major surface 140 and a back major surface 138 of the optical substrate 122 are located in a plane that is substantially perpendicular to the optical axis 114. In one embodiment, "substantially perpendicular" means within five degrees of perpendicular while in an alternative embodiment "substantially perpendicular" means within 15 or 20 degrees of perpendicular.

The light emitted from the optical substrate 122 may have different characteristics depending on the characteristics of the optical substrate 122. For example, the optical substrate 122 may utilize refraction, diffusion, prismatic effect, and/or total internal reflection to direct more diffuse illumination 124 into the field of view 106. Depending on the properties of the optical substrate 122 and the at least one light source 120, the illumination system may be referred to as a diffuse bright field illumination sub-system. The diffuse bright field illumination sub-system may also be called a mid-field illumination system or a medium field illumination system.

In one embodiment, the light emitted from the optical substrate 122 may be emitted substantially parallel to the optical axis 114. For example, light may be emitted within 10 degrees of parallel to the optical axis 114. Illumination having a smaller angle spread around the optical axis 114 may be referred to herein as diffuse bright field illumination 124.

Figure 4A:
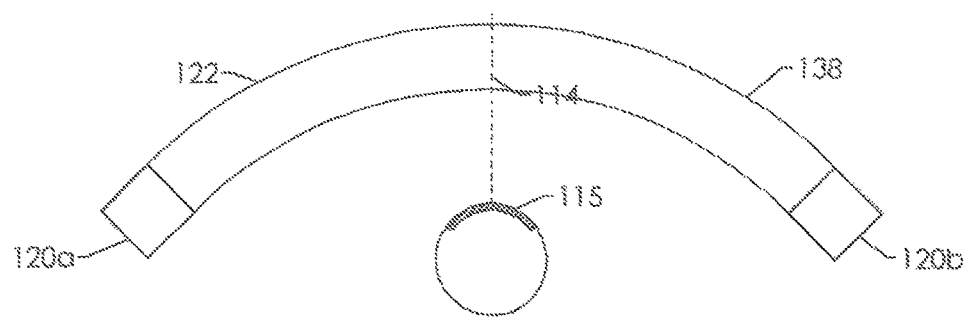
FIGS. 4A-4C are cross-sectional views of the optical substrate in accordance with alternative embodiments.
Figure 4B:
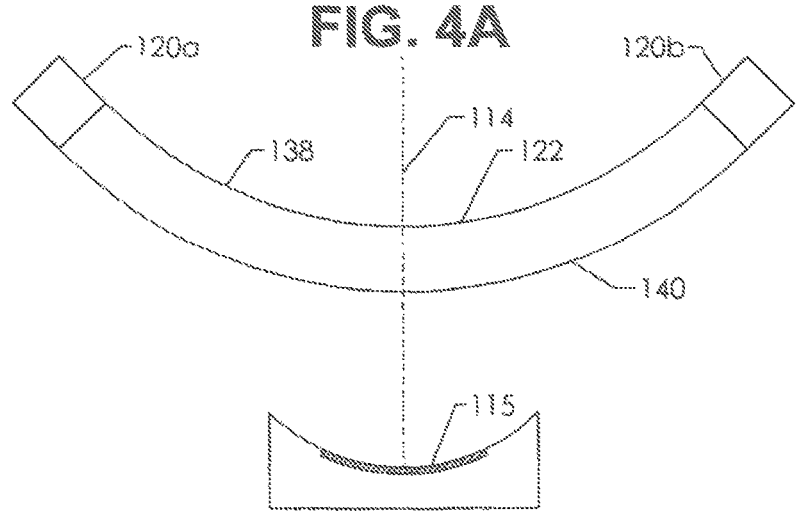
Figure 4C:
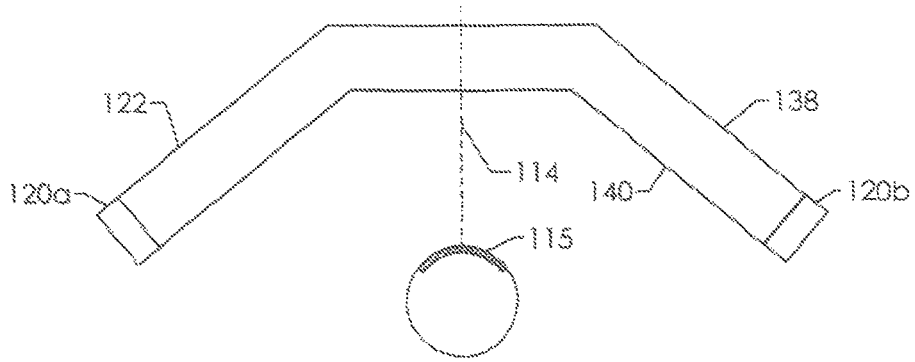

Alternatively, referring to FIGS. 4A to 4C, the optical substrate 122 may be shaped such that the shape of the front major surface 140 and/or the back major surface 138 may be concave, convex, parabolic, or some combination thereof. For example, as shown in FIG. 4A, the optical substrate 122 has a generally concave-shaped front major surface 140 and a convex-shaped back major surface 138, while in FIG. 4B, the optical substrate 122 has a generally convex-shaped front major surface 140 and a concave-shaped back major surface 138. The shape of at least one of the front major surface 140 and the back major surface 138 need not be symmetrical, but may be asymmetrical about a plane perpendicular to the optical axis 114. In FIG. 4C, the front major surface 140 may include three generally planar sections with the central section being generally perpendicular to the optic axis 114 and two generally planar sections adjacent to, and on opposing sides of, the central section, being at an angle relative to the optic axis. In one embodiment the angle may be no greater than 45 degrees. In this embodiment the back major surface 138 may also include corresponding sections with the central section being generally perpendicular to the optic axis 114 and two generally planar sections adjacent to, and on opposing sides of, the central section, being at an angle relative to the optic axis. In one embodiment, the angle of the two opposing sides of the back major surface 138 may be the same angle as the two opposing sides of the front major surface 140. In another embodiment the angles may be different.

The light emitted by the configurations shown in FIGS. 4A-4C may be emitted at different angles relative to the optical axis 114 compared to the diffuse bright field illumination sub-system 105 depicted in FIG. 1.

The diffuse bright field illumination sub-system 105 with these configurations is a diffuse bright field illumination system providing uniform illumination for barcodes applied to a concave/convex surface.

As discussed, the optical substrate 122 may be positioned between the one or more light sources 120. For example, as shown in FIGS. 1 and 2A, the one or more light sources 120 may be located along an edge 186 of the optical substrate 122 that is located between the front major surface 140 and the back major surface 138. The one or more light sources 120 introduce light into the edge 186 of the optical substrate. In FIG. 1, light is introduced from the one or more light sources 120 into the optical substrate 122 in a direction generally perpendicular to the optical axis 114 and generally towards the optical axis 114.

For example, as shown in FIG. 3B the one or more light sources 120 may be located along an edge of the back major surface 138 of the optical substrate 122 with the chamfered edge 125 reflecting illumination in a direction between the front major surface 140 and the back major surface 138 in a direction generally perpendicular to the optical axis 114 and generally towards the optical axis 114.

The center of the optical substrate 122 may include an opening 133 (as shown in FIG. 2E) or an aperture 132 (as shown in FIGS. 2A-2D) through which objects (such as a barcode) within the field of view 106 may be visible to the optic system 104 and the photo sensor array 102. As shown in FIGS. 2A-2D, the aperture 132 may be rectangular and of sufficient size such that the optical substrate 122 is not within the field of view 106 of the camera. As shown in FIG. 2E, the optical substrate 122 may have an approximately annular shape where the center opening 133 of the annular optical substrate 122 is circular and of sufficient size such that the optical substrate 122 is not within the field of view 106 of the camera.

With continued reference to FIG. 2E, the optical substrate 122 may have an annular shape that includes an outer edge 186 and an inner edge 187. In the depicted embodiment multiple light sources 120a-d may be positioned on the back major surface 138 of the optical substrate 122 and may input light into the optical substrate 122 through the back major surface 138. For example, the light sources 120a-d may be positioned as shown in FIG. 3B or 3C. In FIGS. 3B and 3C, the light sources 120a-d input light through the back major surface 138 in a direction approximately parallel to the optical axis 114. After entering the optical substrate 122, the light is reflected by a chamfered edge 125 of the outer edge 186. The chamfered edge 125 is configured to reflect light onto a path relatively perpendicular to the optical axis 114. In another embodiment (not shown) in which the optical substrate has an annular shape, light enters the optical substrate 122 through the outside edge 186 in a direction approximately perpendicular to the optical axis 114.

To prevent the optical substrate 122 from functioning simply as a light pipe or light guide, the optical substrate 122 includes one or more extraction features 142 configured to extract light from the optical substrate 122 and into the field of view 106. The extraction features 142 may introduce a variation in the index of refraction (i.e., a location of a non-uniform index of refraction) of the optical substrate 122. Each extraction feature 142 functions to disrupt the total internal reflection of the propagating light that is incident on the extraction feature.

As described above with respect to FIGS. 2A and 2D, the illumination 190a-d directed into the edge 186 of the optical substrate 122 generally propagates through the optical substrate 122 due to total internal reflection. Any illumination 190a-d that is incident on the one or more extraction features 142 may be diffused with a first portion being diffused at an angle such that the illumination continues propagating within the optical substrate 122 (based on total internal reflection) and a second portion that may be diffused at an angle (i.e., an escape angle) that overcomes total internal reflection, "escapes" the surface, and is directed into the field of view 106.

The extraction of illumination through the front major surface introduced by the extraction features 142 may comprise at least one of: i) one or more particles within the optical substrate 122; ii) a planar surface within the optical substrate 122; iii) a variation in the surface topography of the back major surface 138; and iv) a variation in the surface topography of the front major surface 140. For example, in FIGS. 3A and 3B, the optical substrate 122 is embedded with particles having an index of refraction greater or less than the optical substrate 122. As light travels from the edge 186 of the optical substrate 122 through total internal reflection towards a center of the optical substrate 122, the particles disrupt the total internal reflection of the light, causing a portion of the propagating light to exit through the front major surface 140.

The extraction features 142 may be configured to extract light in a defined intensity profile over the front major surface 140, such as a uniform intensity profile, and/or a defined light ray angle distribution. In FIG. 3A, the one or more extraction features 142 are distributed non-uniformly throughout the optical substrate 122. In this example, the one or more extraction features 142 are distributed throughout the optical substrate such that light is uniformly emitted from the front major surface 140 of the optical substrate 122. For example, the extraction features 142 may be spread throughout the optical substrate 122 in concentrations that increase with distance from the at least one light source 120.

Alternatively, in FIG. 3B, the one or more extraction features 142 may be distributed uniformly or non-uniformly throughout the optical substrate. In this example, the one or more extraction features are distributed throughout the optical substrate such that light is not uniformly emitted from the front major surface 140 of the optical substrate 122. Instead the light is emitted from the front major surface 140 in a desired intensity pattern. While not shown, the one or more extraction features 142 may be distributed in alternative patterns that result in the light being emitted from the front major surface 140 of the optical substrate 122 having a more structured appearance (i.e., a non-uniform intensity pattern).

As shown in FIGS. 3C and 3E, the extraction features 142 may also comprise a surface variation in the topography of at least one of the front major surface 140 and the back major surface 138. In the depicted embodiment of FIG. 3C, the one or more extraction features 142 comprise variations in the back major surface 138 of the optical substrate 122. In this example, the front major surface 140 of the optical substrate 122 is smooth and planar, while the back major surface 138 includes a topography of convex and concave indentations and protrusions. In the depicted embodiment of FIG. 3E, both the back major surface 138 and the front major surface 140 include extraction features 142 comprising convex and concave indentations and protrusions.

These embodiments are configured to result in a homogenous output of light from the front major surface 140.

The convex and concave indentations and protrusions may be: i) extraction features 142 with specific optical properties, such as micro lenses formed by, for example, molding or laser cutting; or ii) extraction features 142 with no specific optical properties (i.e., random) such as a roughened surface formed by any of a textured tool or sanding of the surface after molding. Further, the shape, density, or other optical properties of the extraction features 142 may increase with distance from the light source 120*a*-*d* in order to produce uniform illumination from the optical substrate.

Referring to FIGS. 3D and 3F, the one or more extraction features 142 comprise a surface within the optical substrate 122. In this embodiment, the optical substrate 122 may be made of two different materials 546, 548. These materials 546, 548 may have different indices of refraction, and they may be in contact with one another. In FIG. 3E, the contact is along a surface forming the one or more extraction features 142. In FIG. 3F the contact is along a surface of convex and concave shapes, either patterned or random. Refraction at the one or more extraction features 142 directs illumination towards the front major surface 140 of the optical substrate 122 at an angle where the illumination exits the front major surface 140 towards the field of view 106. As a variation to these embodiments, the materials 546, 548 may have the same index of refraction, but a material with a different index of refraction may be sandwiched between the materials 546, 548 at the non-planar contact surface.

As will be understood by one of ordinary skill in the art, the optical substrate 122 and the extraction features 142 are not limited to these described embodiments. Other embodiments of the optical substrate 122 including extraction features 142 are also within the scope of the present disclosure.

In all of these embodiments, to further increase the quantity of illumination exiting through the front major surface 140, a reflective backing 144 may be applied to the back major surface 138. The reflective backing 144 may be applied uniformly such that it covers the entire back major surface 138. The reflective backing 144 reduces the amount of light that escapes through the back major surface 138 by reflecting light back inward into the optical substrate 122. In another embodiment, a cladding film (not shown) having an index of refraction less than the index of refraction of the optical substrate 122 is adjacent the back major surface 138. The cladding film reduces the amount of light that escapes by reflecting light inward through total internal reflection. Similarly, all edges and surfaces of the optical substrate 122 (except for the edges 186 where the one or more light sources 120*a*-*d* project illumination into the optical substrate 122) may also be coated with a reflective backing 144.

Referring again to FIG. 1, the dark field illumination sub-system (i.e., a close-range illumination sub-system) 152 may include one or more dark field illumination sources 152*a*-*b*. Light from the one or more dark field illumination sources 152*a*-*b* may be emitted at an angle closer to perpendicular to the optical axis 114 than the light from either of the direct bright field illumination sub-system 108 or the diffuse bright field illumination sub-system 105.

Each of the at least one or more dark field illumination sources 152*a*-*b* may comprise an LED. Additional optics 154*a*-*b* may also be associated with the one or more dark field illumination sources 152*a*-*b* to direct illumination to the field of view 106. The additional optics 154*a*-*b* may utilize refraction, diffusion, prismatic effect, and/or total internal reflection to direct dark field illumination 156*a*-*b* into the field of view 106.

The dark field illumination 156*a*-*b* emitted by the at least one dark field illumination source 152*a*-*b* may be emitted at an angle no more than 45° from a plane perpendicular to the optical axis 114.

The dark field illumination 156*a*-*b* may be optimal for reading a barcode that is located within the close zone 158 of the field of view 106. However, the dark field illumination 156*a*-*b* may not be sufficiently bright to provide optimal illumination for reading a barcode that is located farther away from the barcode reader 100 than from the close zone ending boundary 162.

In the embodiment shown in FIG. 1, the dark field illumination sources 152*a*-*b* may be mounted on circuit boards at the sides of the barcode reader housing 101. The optics 154*a*-*b* may comprise lenses, gratings, or diffusion material that diffuses the illumination 156*a*-*b* from the dark field illumination sources 152*a*-*b*.

Figure 5:
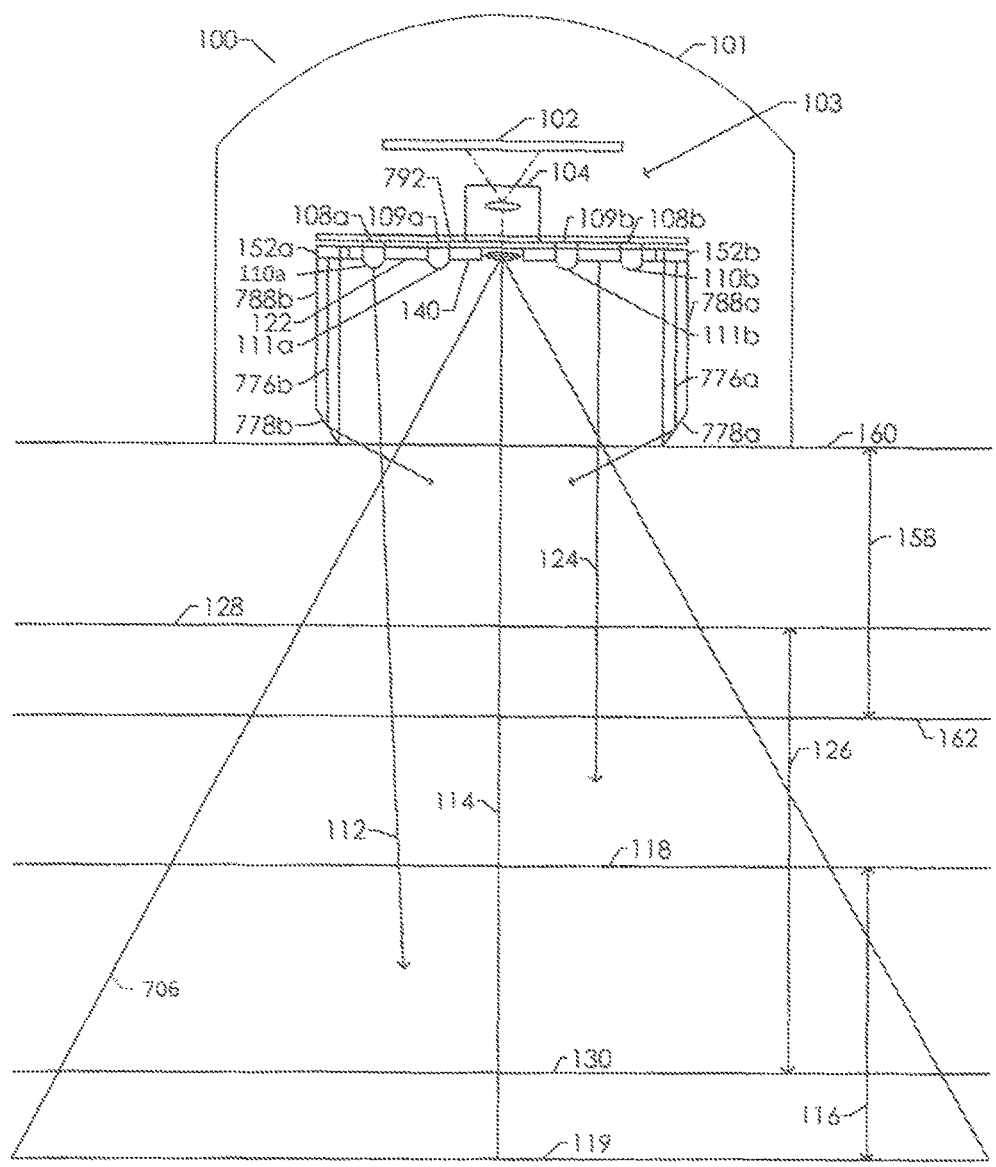
FIG. 5 is a top-down view of a barcode reader in accordance with another embodiment of the present disclosure.

With reference to FIG. 5, an alternative embodiment of the barcode reader 100 is explained. In this embodiment, at least one tertiary light source 152*a*-*b* is mounted on a circuit board 792 that is substantially perpendicular to the optical axis 114. Illumination 776*a*-*b* from the at least one tertiary light source 152*a*-*b* is directed substantially parallel to the optical axis 114 toward chamfered ends 778*a*-*b*. More specifically, at least one tertiary light source 152*a*-*b* may project illumination 776*a*-*b* into light pipes 788*a*-*b*, which use total internal reflection to propagate the illumination 776*a*-*b* toward the chamfered ends 778*a*-*b*. The chamfered ends 778*a-b* are used to re-direct the illumination 776*a-b* toward the field of view 106 at the desired angle.

The light pipes 788*a-b* may comprise chamfered ends 778*a-b*. These chamfered ends 778*a-b* may serve as the prism optics that re-directs the illumination 776*a-b* toward the field of view. Each of the chamfered ends 778*a-b* may be angled such that total internal reflection redirects the illumination 776*a-b* at a non-zero angle (e.g., 45°) relative to the plane that is perpendicular to the optical axis 114. The illumination 776*a-b* may exit the light pipes 788*a-b* through the side facing the optical axis 114. It should be appreciated that the light pipes 788*a-b* are shown in cross section and may be on each side of the camera (i.e., all four sides, left, right, top, bottom) or may even form an annular ring around the field of view of the camera.

Figure 6:
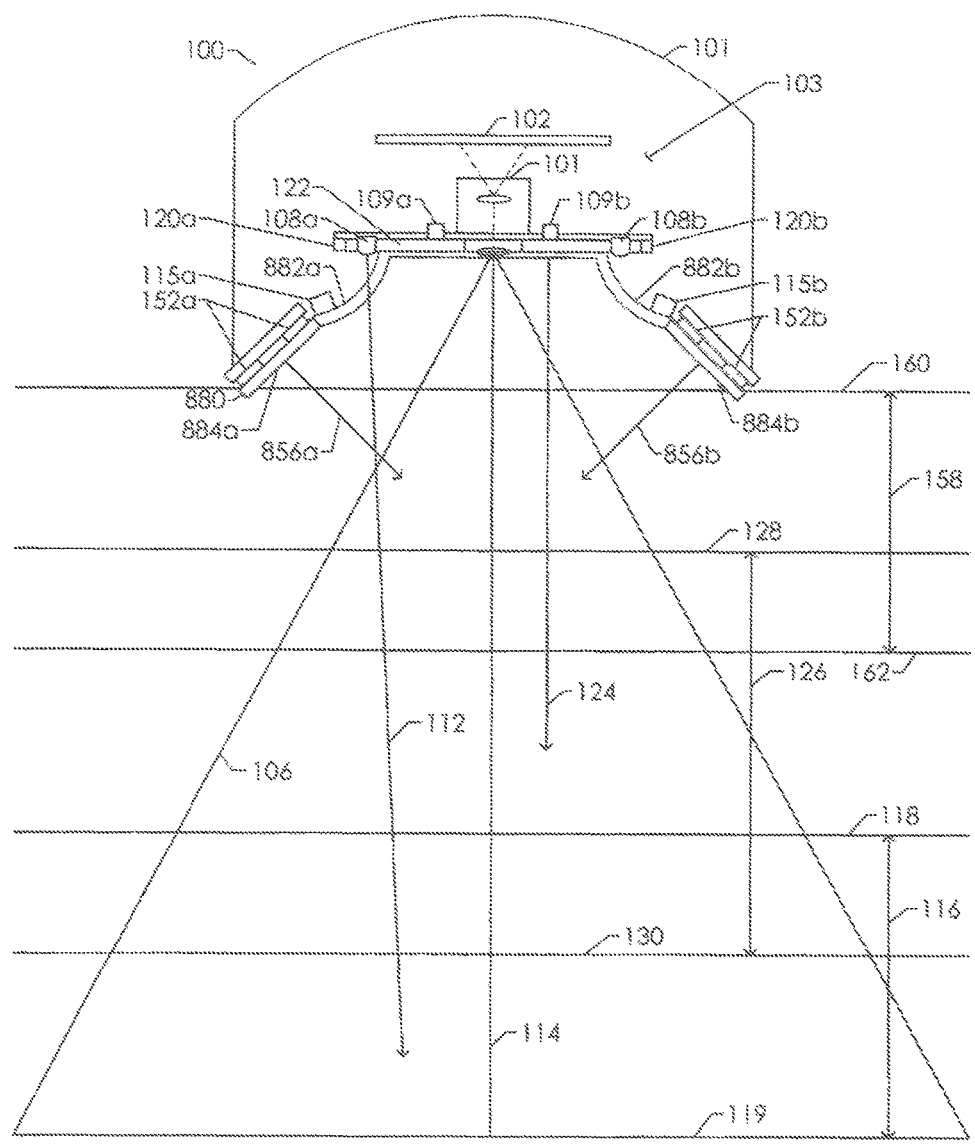
FIG. 6 is a top-down view of a barcode reader in accordance with another embodiment of the present disclosure.

Referring to FIG. 6, another embodiment of the barcode reader 100 is shown. In this embodiment, the optical substrate 880 forms a protective window over optical substrate 122 and replaces the optics 110*a-b*, and 154*a-b* of FIG. 1. In this example, the at least one tertiary light source 152 comprises LEDs positioned behind diffusion regions 884*a-b* of the optical substrate 880. The diffusion regions 884*a-b* direct dark field illumination 856*a-b* from the LEDs into the field of view 106. The curved regions 882*a-b* provide structural support for the diffusion regions 884*a-b* as well as focus the illumination projected from secondary illumination sources 108*a*, 108*b*, or secondary illumination sources 115*a*, 115*b*.

Figure 7:
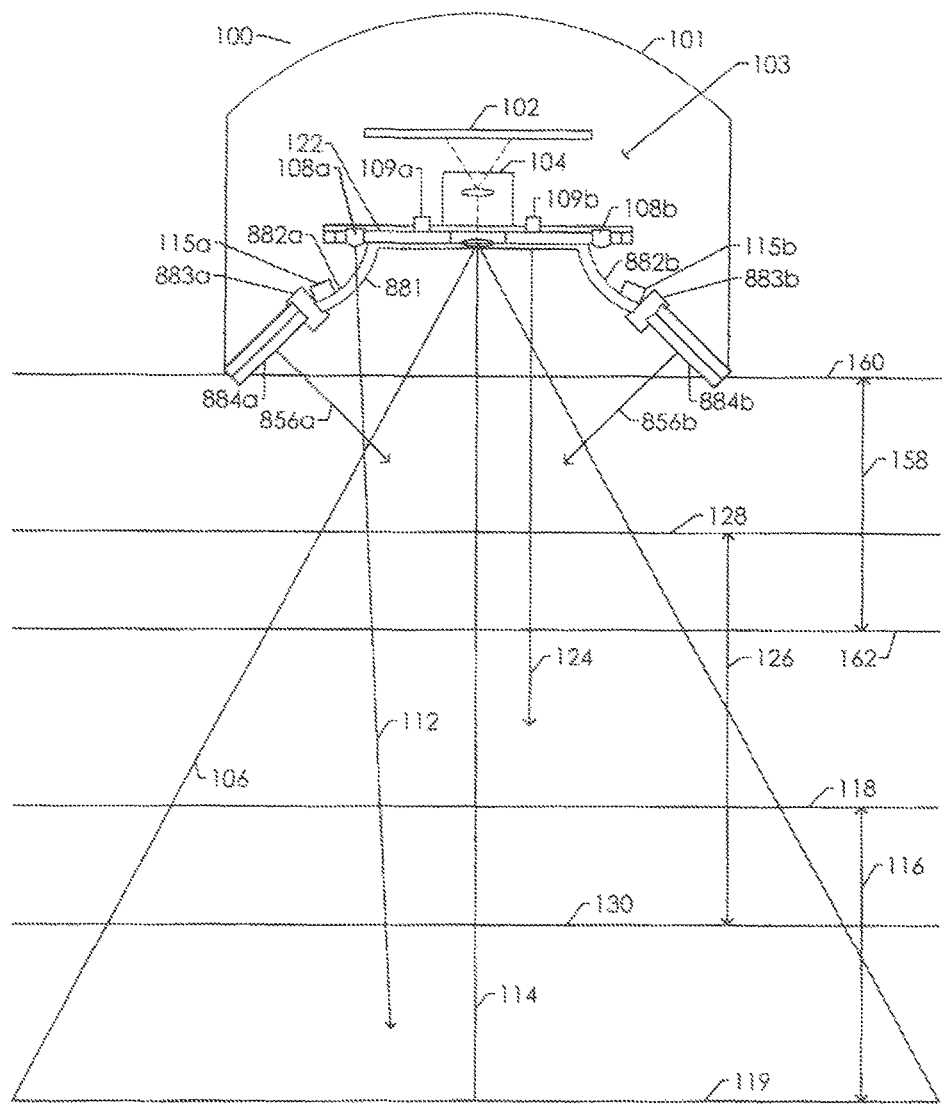
FIG. 7 is a top-down view of a barcode reader in accordance with another embodiment of the present disclosure.

Referring to FIG. 7, another embodiment of the barcode reader 100 is shown. In this embodiment, the optical substrate 881 forms a protective window over optical substrate 122 and replaces the optics 110*a-b* of FIG. 1.

As shown in FIG. 8A, the diffusion region 884 may include an optical substrate into which illumination 815*a-b* is projected by two side fire illuminators 813*a-b*. The illumination 815*a-b* is internally reflected within the substrate 811 and extracted as diffuse illumination 156 from the optical substrate 811. The optical substrate 811 may have any of the same characteristics and extraction features as the optical substrate 122 as described with respect to FIGS. 1, 2A-2D, 3A-3F and 4A-4C as well as reflective coatings 144 such that illumination propagates between a front major surface 140 and a back major surface 138 of the optical substrate 811 and is extracted through the front major surface 140 as illumination 156.

As shown in FIG. 8B, the diffusion region 884 may include an optical substrate 821 into which illumination 825*a-b* is projected through the back major surface by two illuminators 819*a-b*. The illumination 825*a-b* is reflected from chamfered surfaces such that it propagates between the front major surface 140 and the back major surface 138 and is extracted as diffuse illumination 156 from the optical substrate 821. As with optical substrate 811, the optical substrate 821 may have any of the characteristics, and extraction features, as the optical substrate 122 as described with respect to FIGS. 1, 2A-2D, 3A-3F, and 4A-4C, as well as reflective coatings 144 such that illumination propagates between a front major surface 140 and a back major surface 138 of the optical substrate 821 and is extracted through the front major surface as illumination 156.

The diffusion regions 884*a-b* direct dark field illumination 856*a-b* from the LEDs into the field of view 106. The curved regions 882*a-b* provide structural support for and focus the illumination projected from secondary illumination sources 108*a*, 108*b* or secondary illumination sources 115*a*, 115*b*. Posts 883*a* and 883*b* provide structural support for diffusion region 884*a-b* and prevent illumination from entering into the curved regions 882*a-b*.

The previous discussion has been directed to a barcode reader that includes three different light sources: at least one secondary light source (a bright field illumination system, positioned as any of: i) closer to (i.e., in front of) the field of view than to the tertiary light sources; ii) behind the tertiary light sources but in front of the diffuse bright field illumination sources; or iii) behind the diffuse bright field illumination sources and the optical substrate 122, behind at least one light source (i.e., a diffuse bright field illumination system), and behind at least one tertiary light source (i.e., a dark field illumination system).

It should also be appreciated that each of these illumination sources may generate illumination with different characteristics. For example, the diffuse bright field illumination may be white LEDs (i.e., illumination with intensity across a wide spectrum of wave lengths) while the tertiary light source and the secondary light source may be red LEDs (i.e., intensity at 660 nm).

Figure 9A:
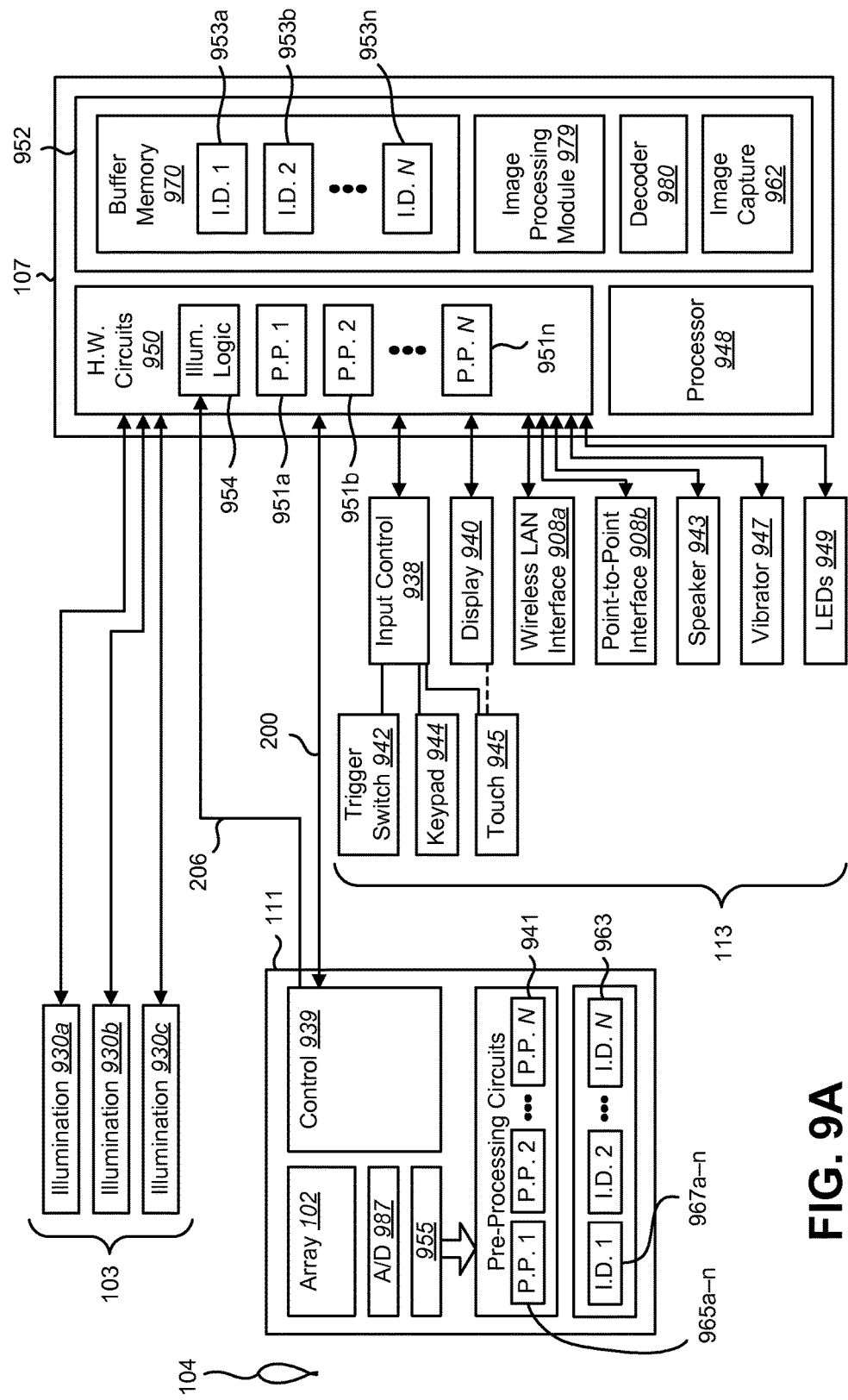
FIG. 9A is a block diagram representative of a barcode reader including an image capture control and decode system in combination with an image sensor system package, an illumination system, and various input/output (I/O) peripheral systems in accordance with one embodiment of the present disclosure.

FIG. 9A is a block diagram representative of a barcode reader, such as barcode reader 100, including an image capture control and decode system 107 in combination with an image sensor system package 111, an illumination system 103, and various input/output (I/O) peripheral systems 113 in accordance with one embodiment of the present disclosure. The image sensor system package 111 and the image capture control and decode system 107 may be included in two separate packages, each of which may include one or more silicon dies that may include: i) a processor; ii) hardware circuits including digital signal processing and/or gate logic, and iii) memory. The processor may be a general purpose single or multi-die microprocessor (e.g., an ARM), a special purpose microprocessor (e.g., a digital signal processor (DSP)), a microcontroller, a programmable gate array, etc. The processor may be referred to as a central processing unit (CPU). The memory may be any combination of non-volatile memory or storage and volatile memory or storage. The non-volatile memory may include a combination of read only memory (ROM) and/or flash memory.

Illumination Systems

The illumination system 103 includes a plurality of illumination sub-systems 930*a-c*, each having different illumination characteristics. Some examples of different illumination characteristics include the angle of illumination with respect to an optical axis, the intensity of illumination, the wavelength of illumination, diffusion characteristics of the illumination, the illumination profile which may include the intensity of the illumination within a two dimensional plane spaced from the barcode reader 100 or the three dimensional shape within the field of view at which illumination emitted by the illumination sub-system has a predetermined intensity, etc.

The plurality of illumination sub-systems 930*a-c* may include a direct bright field illumination system, for example, similar to the direct bright field illumination sub-system 108 shown in FIG. 1, a diffuse bright field illumination sub-system, for example, similar to the diffuse bright field illumination sub-system 105 shown in FIG. 1, and a dark field illumination sub-system, for example, similar to the dark field illumination sub-system 152 shown in FIG. 1.

It should be noted that the number of illumination sub-systems 930*a-c* shown in FIG. 9A and the characteristics of each illumination sub-system disclosed herein are provided only as an example. In an alternative configuration, a barcode reader may include more than three (or any number of) different illumination sub-systems, and the illumination sub-systems may provide illumination having different illumination characteristics (e.g., by changing the intensity, wavelength, angle, diffusion characteristics of the illumination, illumination profile characteristics or the like).

I/O Peripheral Systems

The I/O peripheral systems 113 may include a user interface comprising input control 938 and/or a display 940. The input control 938 may include a trigger switch 942, a keypad 944, and/or a touch panel 945, such as a touch screen over the display 940. In addition, the barcode reader 100 may have one or more output devices that convey information to a user. Such output devices may include the touch panel 945, which may be a touch screen, a speaker 943, a vibrator 947, and/or one or more components that illuminate in a manner visible to a user, such as one or more LEDs 949.

The I/O peripheral systems 113 may further include one or more communication interfaces 908. The communication interfaces 908 may include a wireless LAN interface 908a and a point-to-point interface 908b which may be a wireless point-to-point interface and/or a hardwired point-to-point interface.

The wireless LAN interface 908a may permit the barcode reader 100 to be an addressable endpoint in a wireless local area network and communicate with a host device through the LAN using, for example, Transmission Control Protocol/Internet Protocol (TCP/IP) or the like.

The wireless point-to-point interface(s) 908b may be, for example, a Bluetooth® interface to enable the barcode reader 100 to establish a wireless point-to-point communication link with, and communicate over the wireless communication link with, a host device (i.e., a host computer).

The hardwired point-to-point interface(s) 908b may comprise a Universal Asynchronous Receiver/Transmitter (UART) or a Universal Serial Bus (USB) in each case to enable the barcode reader 100 to establish a point-to-point connection with a host device using a multi-conductor data interface.

Image Capture Control and Decode System

The image capture control and decode system 107 may include: i) a processor 948; ii) a memory 952; and iii) hardware circuits 950 for coupling to, and driving operation of, each of the illumination system 103, the I/O peripheral systems 113, and the image sensor system package 111.

The processor 948, as described, may be a general purpose single or multi-die microprocessor (e.g., an ARM), a special purpose microprocessor (e.g., a digital signal processor (DSP)), a microcontroller, a programmable gate array, etc. The processor 948 may be referred to as a central processing unit (CPU). Although just a single processor 948 is shown in FIG. 9A, in an alternative configuration, a combination of processors (e.g., an ARM and DSP) may be used.

The hardware circuits 950 provide the interface between the image capture control and decode system 107 and each of the illumination system 103, the I/O peripheral systems 113, and the image sensor system package 111. The hardware circuits 950 may further include illumination logic 954 and pre-processing circuits 951a-n, each of which will be described in more detail herein.

The memory 952, as described, may be any combination of non-volatile memory or storage and volatile memory or storage. The memory 952 may include an image buffer 970, an image processing module 979, a decoder 980, and an image capture module 962. These components may be stored in any combination of volatile and non-volatile memory. Some modules may be stored in both volatile and non-volatile memory, for example, with permanent storage of the module in non-volatile memory and a temporary copy stored in volatile memory for execution by the processor 948. In addition to, or as an alternative to, these modules, the memory 952 may store any number of other modules including but not limited to those set forth in the patent applications incorporated by reference in this disclosure. A more detailed description of the image capture control and decode system 107 is included herein.

Image Sensor System Package

The image sensor system package 111 may include: i) a two-dimensional photo sensor array 102 onto which illumination from the field of view 106 of the barcode reader 100 (FIG. 1) is focused by the optic system 104; ii) hardware gate logic 941 implementing one or more pre-processing circuits 965a-n; iii) volatile memory or storage such as random access memory implementing an image buffer 963; iv) hardware gate logic implementing wide bus logic 955 for transferring each image frame captured by the photo sensor array 102 to the hardware gate logic 941 (or the image buffer 963); and v) control circuitry 939 which may include a combination of gate logic, volatile memory or storage, a processor executing code stored in the memory implementing control of the photo sensor array 102 (image read-out), the wide bus logic 955, the hardware gate logic 941; the image buffer 963, and transfer of image data records to the image capture control and decode system 107.

Photo Sensor Array

The photo sensor array 102 may comprise a two-dimensional rolling shutter array of pixels with each pixel comprising an active photosensitive region capable of measuring or quantifying the intensity of illumination incident on the pixel fabricated, for example, using known complementary metal oxide semiconductor (CMOS) sensor technology. Each pixel may be a photodiode which accumulates charge over the duration of an exposure period. Prior to commencement of the exposure period the photodiode may be coupled to ground to dissipate an accumulated charge and the exposure period for the pixel may commence when the photodiode is de-coupled from ground so that a charge accumulates in proportion to the intensity of illumination incident on the pixel. The charge on the photodiode continues to accumulate so long as illumination is incident on the photodiode. The exposure period ends when the accumulated charge is measured by an analog to digital (A/D) converter.

In one embodiment, the photodiode may couple to the input of an A/D converter when the control circuitry 939 generates a read signal and, upon coupled of the photodiode to the A/D converter, the A/D converter generates a digital value representative of the accumulated charge at the time the photodiode is coupled to the A/D converter which is input to a register of the wide bus logic 955 for transfer to the pre-processing circuits 965a-n (or the image buffer 963).

In another embodiment, the photodiode may be coupled to the input of an A/D converter prior to the end of the exposure period. In this embodiment, the A/D converter may be continually making a digital value representative of the accumulating charge available at its output port with that digital value continually increasing as charge accumulates on the photodiode (i.e. periodically updating the digital value to represent the increasing voltage as charge accumulates on the photodiode). In this embodiment when the control circuitry 939 generates a read signal the then current digital value (at the time of the read signal) is read or input to a register of the wide bus logic 955 for transfer to the pre-processing circuits 965a-n (or the image buffer 963).

In order to improve sensitivity of the photo sensor array 102, the pixels do not include a masked charge storage region associated with each photosensitive region for temporarily holding accumulated charge from the photodiode region prior to coupling the charge from the photodiode to the A/D converter 987. Directly coupling the photosensitive region to the A/D converter 987 means that there is no charge storage region separate from the photodiode on which charge is accumulating. Stated another way, in neither of the foregoing embodiments, is the accumulated charge on the photodiode buffered, as an analog charge or otherwise, prior to being coupled to the A/D converter. Stated in yet another way, in neither of the foregoing embodiments is accumulation of the charge stopped, or the accumulated charge otherwise made static (no more accumulation) prior to being coupled to the A/D converter.

Figure 9B:
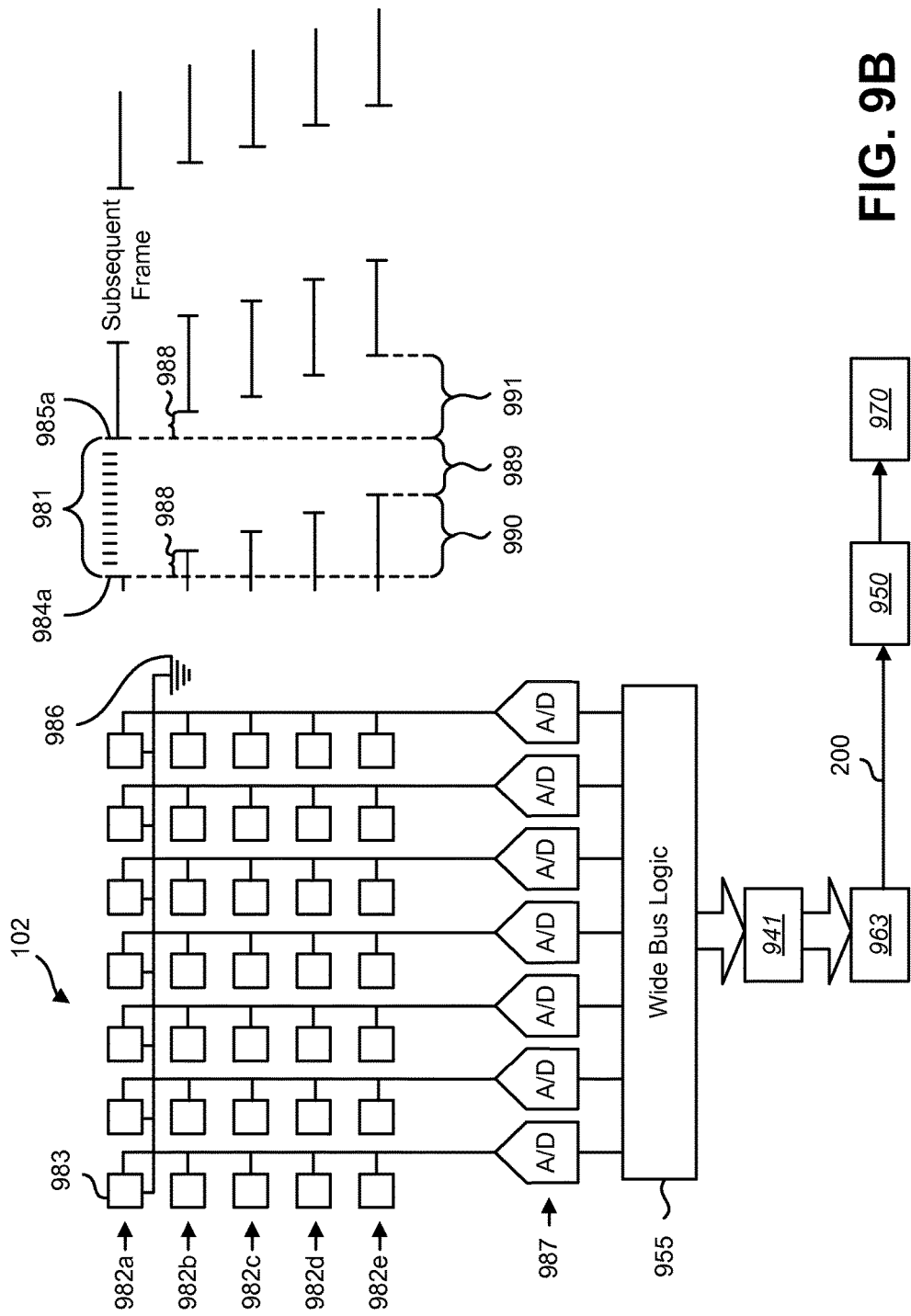
FIG. 9B shows image read-out circuitry and an operation of an image reading out in accordance with one embodiment of the present disclosure.

FIG. 9B depicts a photo sensor array 102 with A/D converters 987 and an image capture operation in accordance with one embodiment of the present disclosure. The photo sensor array 102 may comprise a plurality of rows of pixels 982*a-e* and one A/D converter 987 per column of pixels such that each pixel in an entire row may have a simultaneous exposure period end time and may be simultaneously coupled to a corresponding analog-to-digital (A/D) converter 987 which generates the digital value at the end of the exposure period applicable to the pixel.

In the exemplary embodiment wherein there is one A/D converter per column, the photo sensor array 102 may be operative such that exposure of the rows of pixels 982*a-e* is initiated, and subsequently terminated, sequentially from the first of the plurality of rows (e.g., row 982*a*) to the last of the plurality of rows (e.g., row 982*e*), one row at a time from either the top of the image sensor array 102 to the bottom of the image sensor array 102 or from a top row within a cropped window of the image sensor array 102 to the bottom row within the cropped window of the image sensor array 102.

More specifically, using row 982*a* at a top of the photo sensor array 102 as an example, the exposure period begins at a start of an exposure period 984*a* and the end of the exposure period 985*a*. The start of the exposure period 984*a* begins when the photosensitive region 983 of each pixel within the row is contacted with the ground 986 to dissipate any charge which may have accumulated on the photosensitive region 983 prior to the beginning of the exposure period. The end of the exposure period 985*a* is when the photosensitive region 983 of each pixel in the row is coupled directly to an A/D converter 987 and the A/D converter 987 generates a digital intensity value (digital value) representative of the accumulated charge. The digital intensity value for each pixel within the row may be written to a register of the wide bus logic 955 for output to the pre-processing circuits 965*a-n* or directly to the image buffer 963.

It should be appreciated that one row of pixels at a time may be simultaneously exposed (simultaneous commencement and subsequent simultaneous termination of an exposure period). The next row of pixels may then have a simultaneous exposure period that does not require termination (e.g. coupling of each pixel to an A/D converter) until after the A/D converters have completed operation on the previous row. The time required for an A/D converter to produce a digital value representative of accumulated charge may be referred to as the A/D converter cycle time. When the quantity of A/D converters is equal to the number of columns the minimum read-out time for all rows would be the number of rows multiplied by the A/D converter cycle time.

In more detail, the start of exposure for each row is initiated at a predetermined amount of time 988 following the start of exposure for the immediately preceding row and the end of exposure for each row occurs at the predetermined amount of time 988 following the end of exposure for the immediately preceding row. The predetermined amount of time 988 may be greater than the time required for each pixel in the row to be coupled to its A/D converter 987, the intensity value to be written to the register of the wide bus logic 955, and the register value to be output to the pre-processing circuits 965*a-n* or written to the image buffer 963. In the exemplary embodiment, each row of pixels an exposure period long enough, and read-out fast enough, such that the exposure period is initiated for the last row of pixels 982*e* of the photo sensor array 102 prior to the end of the exposure period (i.e., when read-out commences) for the first row of pixels 982*a* of the photo sensor array 102 such that a time period 989 exists when all rows are being simultaneously exposed.

As such, the total exposure period for the array of pixels comprises: i) a first period 990 being the time between when exposure of the first row of the array is initiated and exposure of the last row of the array is initiated; ii) a second period 989 being the time when all rows are being simultaneously exposed; and iii) a third period 991 being the time between when read-out of the first row of the array is initiated and read-out of the last row is initiated (i.e., the time between when exposure of the first row ends and exposure of the last row of the array ends). In one embodiment, the total exposure period for any particular row remains less than 20 ms. In another embodiment, the total period from start of exposure for the first row and end of exposure for the last row may be less than 20 ms.

In one embodiment, the exposure period 981 may be expressed as a quantity of rows of the image sensor array. The total exposure time may be expressed as the number of rows multiplied by the time 988 required to read-out a row. Stated another way, when the exposure period 981 is expressed as a quantity of rows, the numerical value for the exposure period is the quantity of rows between the row that is then currently commencing its exposure period and the row that is then currently being read-out (ending exposure period). When the exposure period is very short (i.e., a quantity of rows less than the total quantity of rows in the array) read-out of the rows that first started exposure (for example at the top of the array if exposure runs from the top to the bottom) commences before rows at the bottom of the array begin exposure. However, as described above, in the exemplary embodiment, read-out is very fast such that the exposure period, when expressed as a quantity of rows, will be a numerical value greater than the total number of rows in the photo sensor array 102.

While FIG. 9B depicts one A/D converter 987 per column, it should be appreciated that other configurations may include fewer A/D converters 987 (fewer than one (A/D converter 987 per column) or more than one A/D converter 987 per column. The quantity of A/D converters may define the quantity of pixels for which the exposure period may simultaneously end (e.g. the quantity of pixels for which the accumulated charge may be simultaneously converted to a corresponding digital value).

As another example, if the quantity of A/D converters is equal to half the number of columns, one-half of a row of pixels may be simultaneously exposed. The next one-half row of pixels may then have a simultaneous exposure period that does not require termination until after the A/D converters have completed operation on the previous one-half row. If the quantity of A/D converters is equal to one-half the number of columns it would require two A/D converter read-out cycles to read-out each row and the minimum read-out time for all rows would be the number of rows multiplied by two and then multiplied by the A/D converter cycle time.

Figure 9C:
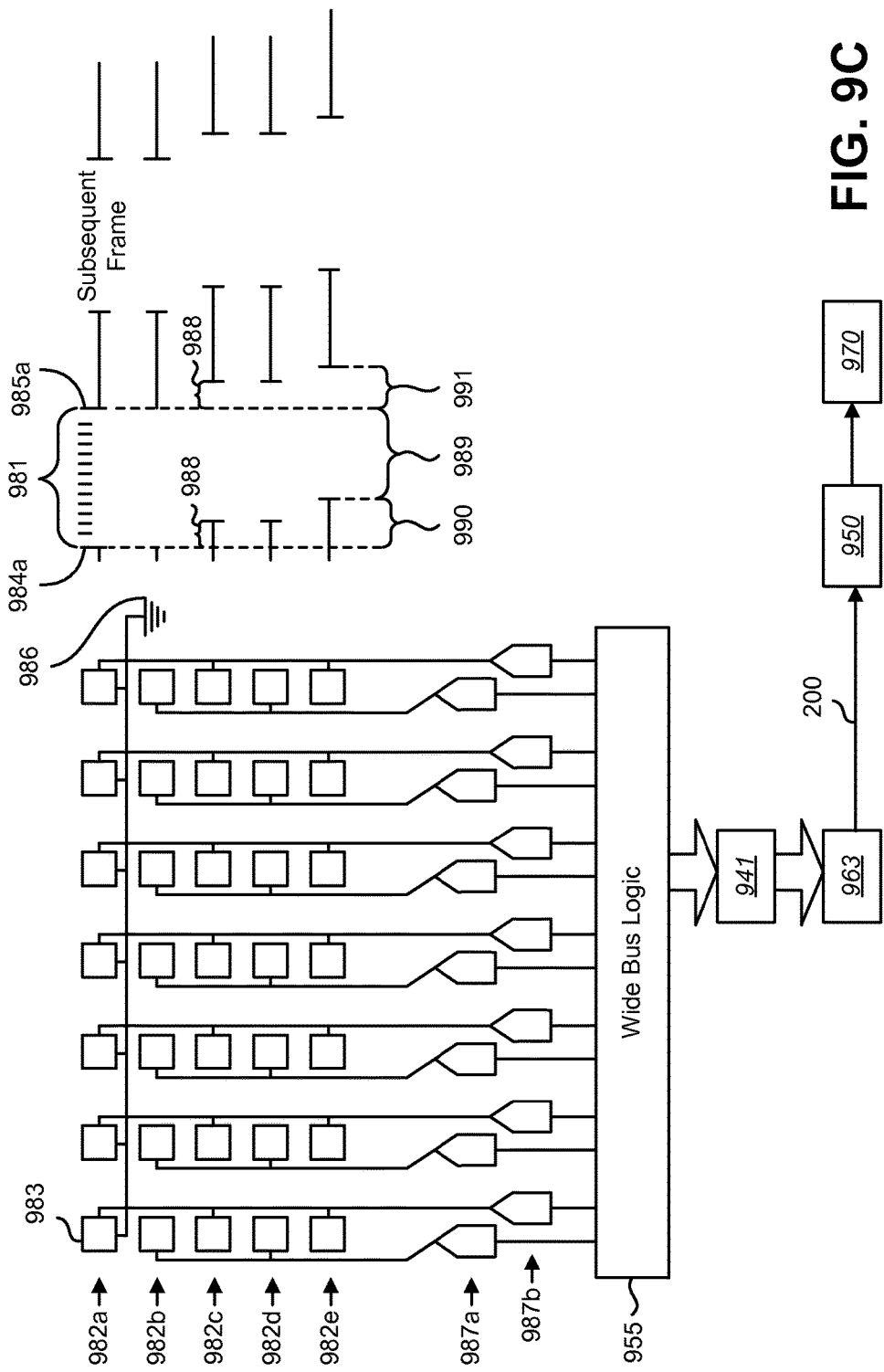
FIG. 9C shows image read-out circuitry and an operation of an image reading out in accordance with another embodiment of the present disclosure.

Similarly, as depicted in FIG. 9C, the quantity of A/D converters 987a and 987b may be equal to twice the number of columns (arranged in two banks of A/D converters 987a and 987b). In this exemplary embodiment, there are a sufficient quantity of A/D converters to read-out two rows simultaneously. Each bank of A/D converters 987a and 987b is connected to, and operates on, every other alternating row of pixels. As such, the photo sensor array 102 may be operative such that exposure of the rows of pixels 982a-e is initiated, and subsequently terminated, sequentially in two-row groups from the first group of rows (e.g., row 982a-b) to the last of the plurality of rows (e.g., group including rows 982d-e).

More specifically, using rows 982a and 982b at as top of the photo sensor array 102 as an example, the exposure period begins at a start of an exposure period 984a and the end of the exposure period 985a. The start of the exposure period 984a begins when the photosensitive region 983 of each pixel within the two rows is contacted with the ground 986 to dissipate any charge which may have accumulated on the photosensitive region 983 prior to the beginning of the exposure period. The end of the exposure period 985a is when the photosensitive region 983 of each pixel in the two rows is coupled directly to an A/D converter 987a, 987b and the A/D converter 987 to generate a digital intensity value (digital value) representative of the accumulated charge. The digital intensity value for each pixel within the two rows may be written to a register of the wide bus logic 955 for output to the pre-processing circuits 965a-n or directly to the image buffer 963.

It should be appreciated that in this embodiment two rows of pixels at a time may be simultaneously exposed (simultaneous commencement and subsequent simultaneous termination of an exposure period). The next group of two rows of pixels may then have a simultaneous exposure period that does not require termination (e.g. coupling of each pixel to an A/D converter) until after the A/D converters have completed operation on the previous group of two rows. Again, the time required for an A/D converter to produce a digital value representative of accumulated charge may be referred to as the A/D converter cycle time. When the quantity of A/D converters is equal to twice the number of columns the minimum read-out time for all rows would be one half the number of rows multiplied by the A/D converter cycle time.

In more detail, the start of exposure for each group of two rows is initiated at a predetermined amount of time 988 following the start of exposure for the immediately preceding group of two rows and the end of exposure for each group of two rows occurs at the predetermined amount of time 988 following the end of exposure for the immediately preceding group of two rows.

The predetermined amount of time 988 may be greater than the time required for each pixel in the group of two rows to be coupled to its A/D converter 987, the intensity value to be written to the register of the wide bus logic 955, and the register value to be output to the pre-processing circuits 965a-n or written to the image buffer 963. In the exemplary embodiment, each pixel within the group of two rows is subject to an exposure period long enough, and read-out fast enough, such that the exposure period is initiated for the last group of two rows of pixels 982d-e of the photo sensor array 102 prior to the end of the exposure period (i.e., when read-out commences) for the first group of two rows of pixels 982a-b of the photo sensor array 102 such that a time period 989 exists when all rows are being simultaneously exposed.

As such, the total exposure period for the array of pixels comprises: i) a first period 990 being the time between when exposure of the first group of two rows of the array is initiated and exposure of the last group of two rows of the array is initiated; ii) a second period 989 being the time when all rows are being simultaneously exposed; and iii) a third period 991 being the time between when read-out of the first group of two rows of the array is initiated and read-out of the last group of two rows is initiated (i.e., the time between when exposure of the first group of two rows ends and exposure of the last group of two rows of the array ends).

In one embodiment, the total exposure period for any particular group of two rows remains less than 20 ms. Alternatively, the total period from start of exposure for the first group of two rows and end of exposure for the last group of two rows may be less than 20 ms.

Windowing, Binning, Sub Sampling (Read-Out Level)

The term image frame, as used herein, may be a full image frame, a binned image frame, a sub-sampled image frame, or a window of any of a full, binned, or sub-sampled image frame.

As used herein, the term "full image frame" refers to an image frame that is captured when an entire photo sensor array 102 is exposed and read-out. Thus, a full image frame may include pixels corresponding to all of the photo sensors in the photo sensor array 102.

As used herein, the term "binned image frame" refers to an image frame that is captured by simultaneously combining the photodiodes for multiple adjacent pixels to a single A/C converter (effectively creating a single pixel with a larger photosensitive region comprising the photosensitive regions of the combined pixels, but an overall lower resolution for the image frame). Common binning may include combining groups of two adjacent pixels horizontally, groups of two adjacent pixels vertically, and two-by-two groups of pixels as depicted in FIG. 12A. The resolution values of the image capture parameter values for an image frame that is to be captured as a binned image frame will define the binning (how adjacent pixels are to be grouped).

As used herein the term "sub-sampled image frame" refers to an image frame that is captured at a lower resolution utilizing a pattern of fewer than all of the pixels applied across the full photo sensor, for example every second pixel or every fourth pixel. The used pixels are read-out while the un-used pixels are not-read-out or the data is ignored. The resolution values of the image capture parameter values for an image frame that is to be captured as a sub-sampled image frame will define the sub-sampling ratio of pixels which are read and used versus un-used pixels.

As used herein the term "a window of an image frame" refers to a portion of a full image frame, a binned image frame or a sub-sampled image frame that is smaller than the full photo sensor array image, either by vertical cropping, horizontal cropping, or both. The portions of the pixels outside of the cropping may not be read-out. The image capture parameter values for an image frame that is to be captured as a windowed image frame (full, binned, or sub-sampled) will define the horizontal and vertical cropping, as applicable.

It should be appreciated that binning, subsampling, and windowing may be performed by the image sensor array 102 at read-out such that the resulting image frame (full, binned, sub-sampled, and/or windowed) is the image frame input to the pre-processing circuits 965a-n.

Wide Bus Logic

To enable digital values representative of illumination on pixels to be transferred very quickly from the A/D converters 987 to the pre-processing circuits 965a-n (or written directly to the image buffer 963) wide bus logic 955 may transfer the digital intensity values from all A/D converters 987 to the pre-processing circuits 965a-n (or the image buffer 963) in parallel (e.g. the same clocking cycles transfer all digital intensity values from all A/D converters 987 to the pre-processing circuits 965a-n (or the image buffer 963) simultaneously).

Stated another way, the wide bus logic 955 may include transfer logic modules, each implementing a channel for transfer of a digital intensity value from an A/D converter 987 to the pre-processing circuits 965a-n (or the image buffer 963), with the quantity of transfer logic modules being equal to the quantity of A/D converters, and with each distinct transfer logic module being coupled to the output of one distinct A/D converter. Stated yet another way, the wide bus logic 955 may implement a digital intensity value transfer bus (from the A/D converters 986 to the pre-processing circuits 965a-n (or the image buffer 963) that is as wide as the number of A/D converters.

Alternatively, the width of the wide bus logic 955 may be 50% of the number of A/D converters, in which case it would take two bus cycles to transfer all digital intensity values from all A/D converters to the pre-processing circuits 965a-n or to the image buffer 963. Alternatively, the width of the wide bus logic 955 may be 25% of the number of columns, in which case it would take four bus cycles to transfer all digital intensity values from all A/D converters to the pre-processing circuits 965a-n or to the image buffer 963. It should be noted that the width of the wide bus logic 955 may be any percentage of the number of columns of the photo sensor array. However, if an entire row of pixels is to undergo a simultaneous exposure period utilizing a quantity of A/D converters equal to the number of pixels in the row, but the bus logic 955 is not sufficient to transfer digital intensity values from all A/D converters simultaneously, the bus logic 955 may include first-in-first-out (FIFO) buffers (one FIFO buffer for each A/D converter) for buffering digital intensity values prior to transfer to the pre-processing circuits 965a-n or to the image buffer 963.

Pre-Processing Circuits

Returning to FIG. 9A, the hardware gate logic 941 includes multiple pre-processing circuits 965a-n. The pre-processing circuits 965a-n may perform operations such as convolution, binning, sub-sampling, cropping and other image processing functions on an image frame (full, binned, sub-sampled, and/or cropped) to generate one or more image data record 967a-n, each of which is derived from the image frame or an image data record that was previously derived from the image frame.

Each pre-processing circuit 965a-n may receive as input either: i) a an image frame (full, binned, sub-sampled, and/or cropped) received directly from the photo sensor array 102 by way of the wide bus logic 955; or ii) an image data record 967a-n from the image buffer 963 which is the result of a different pre-processing circuit 965a-n previously operating on an image frame (full, binned, sub-sampled, and/or cropped) received directly from the photo sensor array 102 by way of the wide bus logic 955.

It should be noted that one image frame (full, binned, sub-sampled, and/or cropped) may be input to multiple pre-processing circuits 965a-n resulting in multiple image data records 967a-n being written to the image buffer 963 for the same frame of image data. Further, for a burst of multiple image frames (described herein), each image frame (full, binned, sub-sampled, and/or cropped) may be input to the same one or more pre-processing circuits 965a-n or permutations of different image frames of the burst may be input to different subsets of pre-processing circuits 965a-n, each subset including one or more pre-processing circuits 965a-n.

It should also be noted that one of the pre-processing circuits 965 may simply write the image frame (full, binned, sub-sampled, and/or cropped) to the image buffer 963 as an image data record 967 without performing substantive image processing (e.g. writing the intensity values received from the A/D converters for the image frame to the image buffer).

Referring briefly to FIG. 14, image processing functions that may be performed by any of the image pre-processing circuits 965a-n and the image data records 967a-n derived from each image frame (whether full, binned, sub-sampled, and/or windowed and/or cropped) include: i) transfer of the image frame or a window within an image frame (full, binned, cropped, or sub-sampled) as a resulting image data record 967a-n to the image buffer 963; ii) cropping of an image frame (full, binned, cropped, or sub-sampled) and transfer of the resulting image data record 967a-n to the image buffer 963; iii) binning an image frame (full, binned, cropped, or sub-sampled) and transfer of the resulting image data record 967a-n to the image buffer 963; iv) subsampling an image frame (full, binned, cropped, or sub-sampled) and transfer of the resulting image data record 967a-n to the image buffer 963; v) generating a rotation of an image frame (full, binned, cropped, or sub-sampled) and transfer of the resulting image data record 967a-n to the image buffer 963; vi) generating a convolution of an image frame (full, binned, cropped, or sub-sampled) and transfer of the resulting image data record 967a-n to the image buffer 963; and vii) generating a double convolution which is a second sequential convolution performed on the result of a previously performed convolution of a an image frame (full, binned, cropped, or sub-sampled) and transfer of the resulting image data record 967a-n to the image buffer 963. Each sequential convolution utilizes a different distinct kernel. Each of these image processing operations is described in more detail herein.

The pre-processing circuits 965a-n may be implemented in hardware gate logic 941 to provide for image processing very quickly such that processing by a pre-processing circuit 965a-n, and thereby generating, and storing in the image buffer 963, one or more image data records 967a-n may be performed during the limited amount of time that the image frame is being read from the photo sensor array 102 such that raw pixel data (i.e., digital intensity values from the A/D converters coupled to the image sensor array) do not need to be stored in memory (other than simple FIFO buffers) prior to being processed by the pre-processing circuits 965a-n.

Control Circuitry

The control circuitry 939 may be any combination of hardware gate logic and/or a processor executing a code stored in a volatile or non-volatile memory. The control circuitry 939 interfaces with the image capture control and decode system 107, the pre-processing circuits 965a-n, and the photo sensor array 102.

In operation the control circuitry may receive, from the image capture control and decode system 107 via bus 200, image capture parameter values for a burst of one or more image frames (full, binned, sub-sampled, and/or cropped) to be sequentially captured. As will be described in more detail herein, the image capture parameter values define, for the burst of one or more image frames to be captured by the photo sensor, a quantity of image frames to be sequentially captured (the burst of images) and, for each image within the burst: i) whether a full image frame, binned image frame, sub-sampled image frame, or a window of a full, binned, or sub-sampled image frame is to be captured; ii) the binning or subsampling resolution (vertically and horizontally) and/or window cropping, if applicable; iii) an exposure setting; iv) a gain setting; and v) an indication of a permutation of one or more pre-processing functions to apply to the image frame (full, binned, sub-sampled and/or windowed), including pre-processing functions that are to be applied to an image data record resulting from a previous pre-processing function being applied to the image frame (full, binned, sub-sampled, and/or windowed).

In further operation, after receiving the image capture parameter values, the control circuitry 939 may, for each image frame to be captured, set image capture settings to the image capture parameter values for the image frame and, in response to a trigger signal from the image capture system package 107, drive the photo sensor array 102 to sequentially capture each of one or more image frames of the burst in accordance with the image capture settings and without further trigger signal(s) from the image capture control and decode system 107.

In more detail, the control circuitry 939 adjusts the image capture settings between the exposure periods for each sequentially captured image frame such that each captured image frame within the burst of image frames is captured with image capture settings specifically defined for that image frame by the image capture control and decode system 107. At least one of the multiple frames of image data may be captured with a distinct value of at least one image capture parameter.

Each captured image frame (full, binned, sub-sampled, and/or windowed) may, under control of the control circuitry 939 be input to selected one or more pre-processing circuits 965a-n in accordance with the image capture parameter values for purposes of performing the pre-processing functions previously described. Resulting image data records 967a-n are written to the image buffer 963.

Further, the control circuitry 939 may, for selected image data records 967a-n in the buffer memory 963, drive selected other pre-processing circuits 965a-n to receive the selected image data record 967a-n and generate, and write to the image buffer 963, an image data record 967a-n which is derived therefrom.

Further yet, the control circuitry 939 may, as requested by the image capture control and decode system 107, provide certain image data records 967a-n (or portions of certain image data records 967a-n) to the image capture control and decode system 107 for further processing and decode.

Image Capture and Decode Module

In one embodiment, the image capture module 962 of the image capture control and decode system 107, when executed by the processor 948 in conjunction with the hardware circuits 950, controls image capture by: i) defining (or receiving from the decoder 980) image capture parameter values for a burst of one or more image frames to be sequentially captured by the photo sensor array 102 of the image sensor package 111 and the image processing to be performed on each image frame; ii) initiating the capture of the sequence of one or more image frames by the photo sensor array 102 and the corresponding performance of the image processing thereon by the pre-processing circuits 965a-n to generate image data records 967a-n, each of which is a derivative of an image frame within the sequence of one or more image frames; and iii) controlling the illumination systems 930a-c to illuminate the barcode within the field of view during capture of each frame of the sequence of one or more image frames. The image capture module 962 may further define, or receive from the decoder an indication of, which of the image data records, or portions of the image data records are to be provided to the decoder 980 for decoding of the barcode.

As described, the image capture parameter values may define a quantity of image frames to be sequentially captured (the burst of images) and, for each image within the burst: i) whether a full image frame, binned image frame, sub-sampled image frame, or a window of a full, binned, or subsampled image frame is to be captured; ii) the binning or subsampling resolution (vertically and horizontally) and/or the windowing cropping for the image frame to be captured if applicable; iii) an exposure setting; iv) a gain setting, v) an indication of a permutation of one or more previously described pre-processing functions to apply to the image frame (full, binned, sub-sampled, and/or cropped) by the image pre-processing circuits 965a-n within hardware circuits 941 of the image sensor system package 111, including pre-processing functions that are to be applied to an image data records 967a-n resulting from a previous pre-processing function being applied to the image frame (full, binned, sub-sampled and/or cropped).

The exposure period may be the duration of time each pixel is exposed (i.e., the duration of time between the beginning of the exposure period and the end of the exposure period).

The gain setting may be a gain value implemented for ensuring that the pixel intensity values (or binned pixel intensity values) utilize the dynamic range of the A/D converters.

Initiating the capture of the sequence of one or more image frames of a barcode within a field of view of the photo sensor array 102 may include providing a single trigger signal to the control circuitry 939 of the image sensor system package 111 to initiate the capture of the sequence of one or more image frames. Such single trigger signal may be provided after the image capture parameter values defining the sequence of image frames to be captured and pre-processing to be performed by pre-processing circuits 965a-n within the image sensor system package 111 have been provided to the control circuitry 939 such that the control circuitry 939 may autonomously capture the sequence of image frames and drive the pre-processing circuits 965a-n to perform the applicable pre-processing in accordance with the image capture parameter values without further control having to be provided by the image capture control and decode system 107.

Controlling the illumination systems 930a-c to illuminate the barcode within the field of view during capture of each frame of the sequence of one or more image frames may comprise controlling illumination logic 954 within hardware circuits 950.

In more detail, the illumination sub-systems 930a-c are coupled to the hardware circuits 950 which providing power required for the light emitting diodes (LEDs) or other illumination sources to generate illumination under control of illumination logic 954. More specifically, for each image frame to be captured by the photo sensor array 102, the image capture module 962 provides illumination parameters to the illumination logic 954 which control the illumination settings to be used for capture of the image frame. More specifically, the illumination parameters may define such illumination settings as: i) identifying which of at least one of the illumination sub-systems 930*a-c* are to be activated for the exposure period in which the image frame is captured; and ii) the intensity of illumination to be generated by each of the illumination sub-systems 930*a-c* that are to be activated. In certain exemplary embodiments the intensity may be defined as: i) a percentage from zero percent (0%) to one hundred percent (100%) representing the percent of a maximum illumination intensity that can be generated by the LEDs (or other illumination sources) of illumination sub-system; ii) pulse-width-modulation (PWM) parameters representing the percentage of time during the exposure period that maximum operating power is applied to the LEDs (or other illumination sources) of the illumination sub-system in a pulsing pattern; and iii) a percentage greater than one hundred percent (100%) representing a power level to be applied if the LEDs of illumination sub-system if the LEDs are to be over-driven.

In certain embodiments, the illumination parameters may be provided to the illumination logic 954 for one or more image frames within a burst of image frames to be captured by the photo sensor array 102 by the image capture module 962 writing the illumination parameters for each frame to a distinct register within the illumination logic 954.

During capture of each image frame of one or more image frames within a burst of image frames, the illumination logic 954 sets the illumination settings for the image frame to conform to the illumination parameters for the image frame by configuring power circuits of the hardware circuits 950 to apply the applicable power to the applicable illumination sub-systems.

In one embodiment, the illumination logic is coupled to a flash signal 206 generated by the control module 939 of the image sensor system package 111. The flash signal is configured to generate a signal indicating a start of each exposure period and an end of each exposure period, for each image frame captured by the image sensor 102 within a burst of one or more image frames. In this embodiment the illumination logic may, for each image frame: i) set the illumination settings for the image frame to conform to the illumination parameters for the image frame by configuring power circuits of the hardware circuits 950 to apply the applicable power to the applicable illumination sub-systems; ii) apply the applicable power to the applicable illumination sub-system 930*a-c* when the flash signal 206 indicates start of the exposure period for the image frame; ii) deactivate the power to the illumination sub-systems 930*a-c* when the flash signal 206 indicates the end of the exposure period; and iv) repeat steps i-iii for the next image frame within the sequence utilizing the illumination parameters for that next image frame within the sequence. The illumination parameters may be considered image capture parameter values in addition to those image capture parameter values previously described.

Decoder

The Decoder 980, when executed by the processor 948, may: i) determine which of the one or more image data records 967*a-n* (or windows within one or more image data records 967*a-n*) may be transferred from the image buffer 963 to the image capture control and decode system 107; ii) determine a permutation of one or more pre-processing functions (performed by pre-processing circuits 951*a-n*) to apply to each of the one of the image data records 967*a-n* (or windows within one or more image data records 967*a-n*) to generate, and write to the buffer memory 970, image data records 953*a-n* (each of which is also a derivative of the one or more image frames (whether full, binned, or sub-sampled) captured by the photo sensor array 102; iii) determine a permutation of one or more pre-processing functions (performed by the image processing module 979 when such code is executed by the processor 948) to apply to each of the one of the image data records 953*a-n* (or windows within one or more image data records 953*a-n*) to generate, and write to the buffer memory 970, additional (or replacement) image data records 953*a-n* (each of which is also a derivative of the one or more image frames (full, binned, sub-sampled, and/or cropped) captured by the photo sensor array 102; and iv) decode the barcode present within the field of view of the barcode reader and imaged within the one or more image frames (whether full, binned, or sub-sampled) captured by the photo sensor array 102 and represented by at least a portion of one of the image data records 953*a-n* derived from such image frame.

Figure 11:
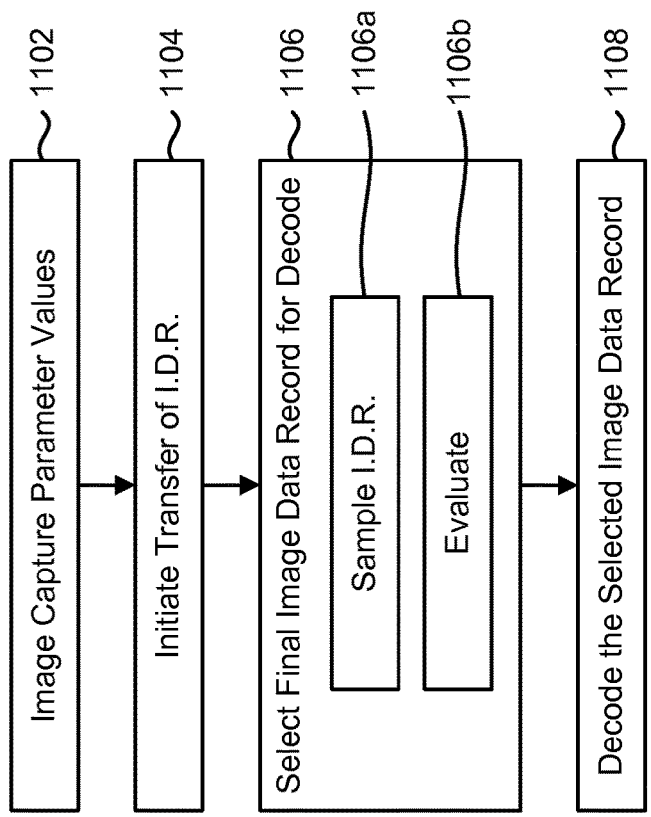
FIG. 11 illustrates an example of a method for decoding an image data record in accordance with one embodiment.

Referring to FIG. 11, exemplary operation of the decoder is depicted in accordance with one embodiment. Step 1102 represents the decoder 980 and/or the image capture module 962 determining the image capture parameter values for a burst of one or more image frames as previously described.

Step 1104 represents transferring one or more image data records 967*a-n* (or portions of one or more image data records 967*a-n*) from the image buffer 963 to the image capture control and decode system 107 and establishing which, if any, pre-processing functions are to be performed by image pre-processing circuits 951*a-n* and/or the image processing module 979.

Step 1106 represents selecting an image data record 953 for decoding, which may include sampling final image data records 953*a-n* at step 1106*a* and evaluating the sample image data records 953*a-n* at step 1106*b*.

Step 1108 represents decoding the selected image data record 953. This operation may include, based on the resulting image data records 953*a-n* meeting or failing to meet certain criteria: i) driving image pre-processing circuits 951*a-n* or the processing module 979 to perform additional image processing operations, as previously described on one or more of the image data records 953*a-n* within the buffer memory 970 (or on a window of, a binning of, or a sub-sampling of each of one or more image data records 953*a-n*) and write resulting additional, or replacement, image data records 953*a-n* to the buffer memory 970; ii) driving the transfer of one or more additional image data records 967*a-n* (full, windowed, binned, or sub-sampled) to the image capture control and decode system 107 (without obtaining an additional burst of one or more image frames) and, optionally driving performance of additional pre-processing operations on the additional image data records 967*a-n* by the pre-processing circuits 951*a-n* or the image processing module 979; and/or iii) driving capture of one or more additional bursts of image frames (whether full, windowed, binned or sub-sampled), resulting in one or more additional image data records 967*a-n* being written to the image buffer 963, and then driving transfer of one or more of the additional image data records 967*a-n* (full, windowed, binned or sub-sampled), but not necessarily all of the additional image data records 967*a-n* in the image buffer 963, to the image capture control and decode system 107 and, optionally driving performance of additional pre-processing operations on the additional image data records 967*a-n* by the pre-processing circuits 951*a-n* or the image processing module 9797. This aspect of the operation may be repeated until at least one of the image data records 953a-n is decodable by the processor 948 operating the decoder 980.

Pre-Processing Circuits 951

The pre-processing circuits 951a-n, similar to pre-processing circuits 965a-n may be implemented within hardware gate logic 950. The pre-processing circuits 951a-n may perform operations such as convolution, binning, sub-sampling and other image processing functions on image data records 967a-n (each of which is provided by the image sensor system package 107 via the bus 200 and each of which is, or is a derivative of, an image frame (full, binned, sub-sampled, and/or cropped) captured by the photo sensor array 102) to generate, and write to the buffer memory 970, one or more image data record 953a-n.

Each pre-processing circuit 951a-n may receive as input either: i) an image data record 967a-n (or a window of, a binning of, or a sub-sampling of, an image data record 967a-n) directly from the image sensor system package 111 by way of the wide bus 200; or ii) an image data record 953a-n from the buffer memory 970 which is the result of a different pre-processing circuit 951a-n previously operating on an image data record 967a-n (or a window of, a binning of, or a sub-sampling of, an image data record 967a-n) received from the image sensor system package 111 by way of the wide bus 200.

It should be noted that one image data record 967a-n (or a window of, a binning of, or a sub-sampling of, an image data record 967a-n) may be input to multiple pre-processing circuits 951a-n, resulting in multiple image data records 953a-n being written to the buffer memory 970 for the same image data record 967a-n (or a window of, a binning of, or a sub-sampling of, an image data record 967a-n).

Further, for a burst of multiple image frames the image data record 967a-n (or a window of, a binning of, or a sub-sampling of, an image data record 967a-n) received and processed by the pre-processing circuits 951a-n may represent different image frames within the burst captured by the photo sensor array 102. The image data records 967a-n (or a window of, a binning of, or a sub-sampling of, an image data record 967a-n) received and processed by the pre-processing circuits 951a-n may be the result of applying the same pre-processing functions by pre-processing circuits 965a-n to each of multiple image frames within the burst.

Each image data record 967a-n (or a window of, a binning of, or a sub-sampling of, an image data record 967a-n) received may be input to the same one or more pre-processing circuits 951a-n or may be input to different subsets of pre-processing circuits 951a-n, each subset including one or more pre-processing circuits 951a-n.

It should also be noted that one of the pre-processing circuits 951a-n may simply write the image data record 967a-n (which may be an image frame captured by the image sensor array 102 (full, binned, sub-sampled, and/or cropped) without previous processing by pre-processing circuits 965a-n) to the buffer memory 970 without performing substantive image processing.

Referring again to FIG. 14, operations performed by, and derivatives of the frame of image data produced by, the pre-processing circuits 951a-n may include: i) transfer of the image data record 967a-n (or a window, binning, or sub-sampling of the image data record 967a-n) to the buffer memory 970 as an image data record 953a-n without substantive processing; ii) binning of an image data record 967a-n (or a window or sub-sampling of the image data record 967a-n) and writing the result to the buffer memory 970 as an image data record 953a-n; iii) subsampling of an image data record 967a-n (or a window, binning, or sub-sampling of the image data record 967a-n) and writing the result to the buffer memory 970 as an image data record 953a-n; iv) generating a rotation of an image data record 967a-n (or a window of, a binning of, or sub-sampling of the image data record 967a-n) and writing the result to the buffer memory 970 as an image data record 953a-n; v) generating a convolution of an image data record 967a-n (or a window or sub-sampling of the image data record 967a-n) and writing the result to the buffer memory 970 as an image data record 953a-n; and vi); generating a double convolution, which is a second sequential convolution performed on the result of a previously performed convolution, of an image data record 967a-n (or a window or sub-sampling of the image data record 967a-n) and writing the result to the buffer memory 970 as an image data record 953a-n. Each sequential convolution utilizes a different distinct kernel.

The pre-processing circuits 951a-n may be implemented in hardware gate logic 950 to provide for image processing very quickly such that processing by a pre-processing circuit 951a-n, and thereby generating, and storing in the buffer memory 970, one or more image data records 953a-n may be performed during the limited amount of time that the image data records 967a-n are being transferred to the image capture control and decode system 107 via the bus 200 without requiring storage of the transferred image data records 967a-n in memory prior to pre-processing by pre-processing circuits 951a-n.

Image Processing Module

The image processing module 979, when executed by the processor 948 may perform similar pre-processing functions as performed by the pre-processing circuits 965a-n and pre-processing circuits 951a-n.

In more detail, the image processing module 979 may perform operations such as convolution, binning, sub-sampling and other image processing functions on image data records 953a-n (each of which is has been previously written to the buffer memory 970 and each of which is, or is a derivative of, an image frame (full, binned, sub-sampled, and/or cropped) captured by the photo sensor array 102) to generate, and write to the buffer memory 970, one or more additional, or replacement, image data record 953a-n.

The image processing module 979 may receive as input an image data record 953a-n (or a window of, a binning of, or a sub-sampling of, an image data record 953a-n) from the buffer memory 970.

It should be noted that one image data record 953a-n (or a window of, a binning of, or a sub-sampling of, an image data record 953a-n) may be input to multiple pre-processing functions of the image processing module 979 resulting in multiple additional, or replacement, image data records 953a-n being written to the buffer memory 970 for the same image data record 953a-n (or a window of, a binning of, or a sub-sampling of, an image data record 953a-n).

Further, for a burst of multiple image frames, the image data record 953a-n (or a window of, a binning of, or a sub-sampling of, an image data record 953a-n) received and processed by the image processing module 979 may represent different image frames within the burst captured by the photo sensor array 102. The image data records 953a-n (or a window of, a binning of, or a sub-sampling of, an image data record 943a-n) received and processed by the image processing module 979 may be the result of applying the same pre-processing functions to each of multiple image frames within the burst.

Each image data record 953a-n (or a window of, a binning of, or a sub-sampling of, an image data record 953a-n) may be input to the same one or more pre-processing functions of the image processing module 979 or may be input to different subsets of pre-processing functions of image processing module 979, each subset including one or more pre-processing functions.

Referring again to FIG. 14, operations performed by, and derivatives of the frame of image data produced by, the image processing module 979 may include: i) binning of an image data record 953a-n (or a window or sub-sampling of the image data record 953a-n) and writing the result to the buffer memory 970 as an additional, or replacement, image data record 953a-n; ii) subsampling of an image data record 951a-n (or a window, binning, or sub-sampling of the image data record 951a-n) and writing the result to the buffer memory 970 as an additional, or replacement, image data record 953a-n; iii) generating a rotation of an image data record 953a-n (or a window of, a binning of, or sub-sampling of the image data record 953a-n) and writing the result to the buffer memory 970 as an additional, or replacement, image data record 953a-n; iv) generating a convolution of an image data record 953a-n (or a window or sub-sampling of the image data record 953a-n) and writing the result to the buffer memory 970 as an additional, or replacement, image data record 953a-n; and v); generating a double convolution, which is a second sequential convolution performed on the result of a previously performed convolution, of an image data record 953a-n (or a window or sub-sampling of the image data record 953a-n) and writing the result to the buffer memory 970 as an additional, or replacement, image data record 953a-n. Again, each sequential convolution utilizes a different distinct kernel.

Further, as previously discussed, the decoder may additionally, prior to the capture of the burst one or more image frames by the photo sensor array 102, based on analysis of image data records 953a-n derived from one or more previous bursts of one or more image frames (full, binned, sub-sampled, and/or cropped) define any permutation of, or all of, the image capture parameter values previously discussed for the burst (or next burst) of one or more image frames.

Again, such image capture parameter values defining: a quantity of image frames to be sequentially captured (the burst of images) and, for each image within the burst: i) whether a full image frame, binned image frame, or sub-sampled image frame is to be captured; ii) the binning or subsampling resolution (vertically and horizontally) for the image frame to be captured if applicable; iii) an exposure setting; iv) a gain setting, v) an indication of a permutation of one or more pre-processing functions to apply to the image frame (full, binned, or sub-sampled), including pre-processing functions that are to be applied to an image data record resulting from a previous pre-processing function being applied to the image frame (whether full, binned, or sub-sampled).

The image capture parameter values may be provided directly by the decoder 980 to the control circuitry 939 of the image capture system package 111 via the bus 200 or may be provided to the image capture module 962 which in turn provides the image capture parameter values to the control circuitry 939 of the image capture system package 111 via the bus 200.

Interface 200

As discussed, the image sensor system package 111 and the image capture control and decode system 107 may be included in two separate packages communicating over the interface 200.

Figure 9D:
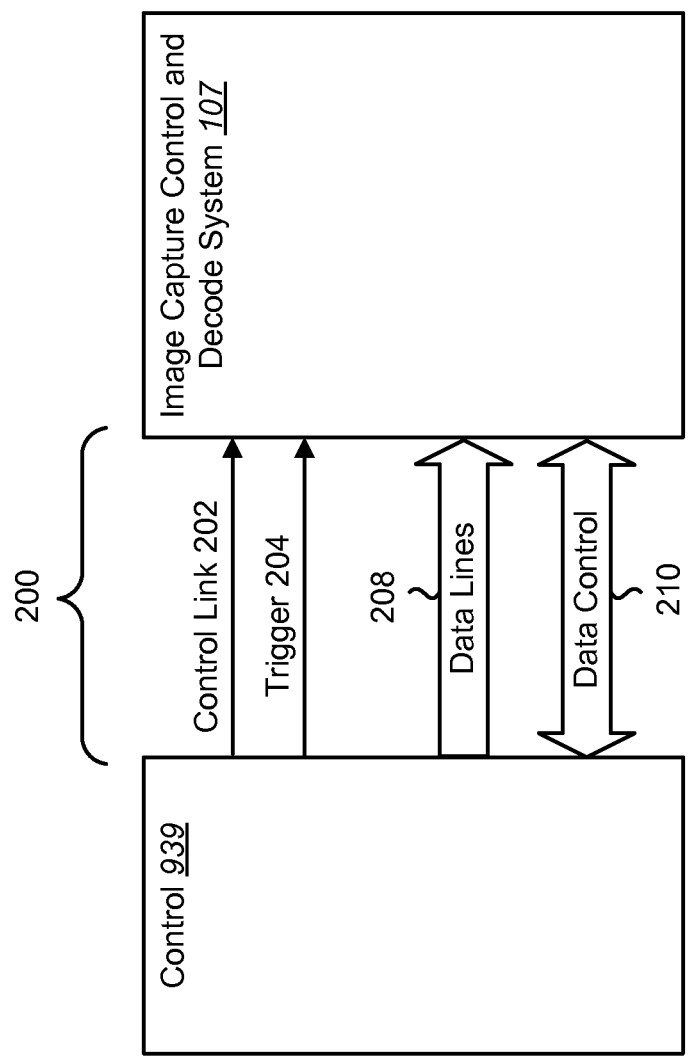
FIG. 9D shows an example of an interface between the control circuitry in the image sensor system package and the image capture control and decode system.

FIG. 9D shows the interface 200 between the image sensor system package 111 and the image capture control and decode system 107. The interface 200 may comprise a control link 202 that may be a two-way serial control channel enabling the image capture control and decode system 107 to: i) set parameters (e.g., the quantity of images to be captured in a burst, exposure period for each frame, gain setting for each frame, resolution setting for each frame, or the like); ii) select which image pre-processing circuits 965a-n are to be applied to each captured frame, thereby determining the characteristics of the image data records 967a-n written to the image buffer 963; and iii) select image data records 967 for transfer to the image capture control and decode system 107.

The interface 200 may further include a trigger signal line 204 controlled by the image capture control and decode system 107 to initiate autonomous capture of a burst of one or more image frames and subsequent image pre-processing and writing of image data records 967a-n to the image buffer 963.

The interface 200 may further include a flash signal line 206 which is output by the image sensor system package 111 to signal the start of each exposure period and the end of each exposure period. The image capture control and decode system 107 may control the illumination system 103 based on the flash signal on the flash signal line 206. More particularly, the image capture control and decode system 107 may activate the selected illumination system(s) 930a-n at the selected intensities during the exposure of each applicable frame based on the flash signal line 206 indicating start of the exposure period. The illumination system 103 may be configured to deactivate the exposure illumination when the flash signal line 206 indicates end of the exposure period activate the targeting illumination during the time period between exposure periods of sequential frames.

The interface 200 may further include data lines 208 that may be parallel or serial and that provide for the transfer of image data records 967 from the image sensor system package 111 to the image capture control and decode system 107.

The interface 200 may further include data control signals 210 which may be signals to indicate the time each pixel value is valid on a data line, and indicate location of the pixel within the image array represented by the image data records (e.g., horizontal blanking, vertical blanking).

It should be appreciated that the barcode image is captured, processed, and stored in the first package (i.e., the image sensor system package 111) at a much faster speed and may then be transferred to the second package (the image capture control and decode system 107) for decoding at a slower speed. The image buffer 963 may be large enough to hold an entire frame of image data (in combination with image data records 967a-n derived from the frame of image data), and the entire frame of image data and/or combinations of one or more image data records 967a-n may be read-out of the image buffer 963 after the entire frame of image data is put into the image buffer 963.

In one embodiment, instead of transferring all frames of image data captured in a burst, a subset of the multiple frames of image data generated in a burst may be transferred to the image capture control and decode system 107 at a speed commensurate with transfer by bus 200 the second or slower speed).

Operation

Figure 10:
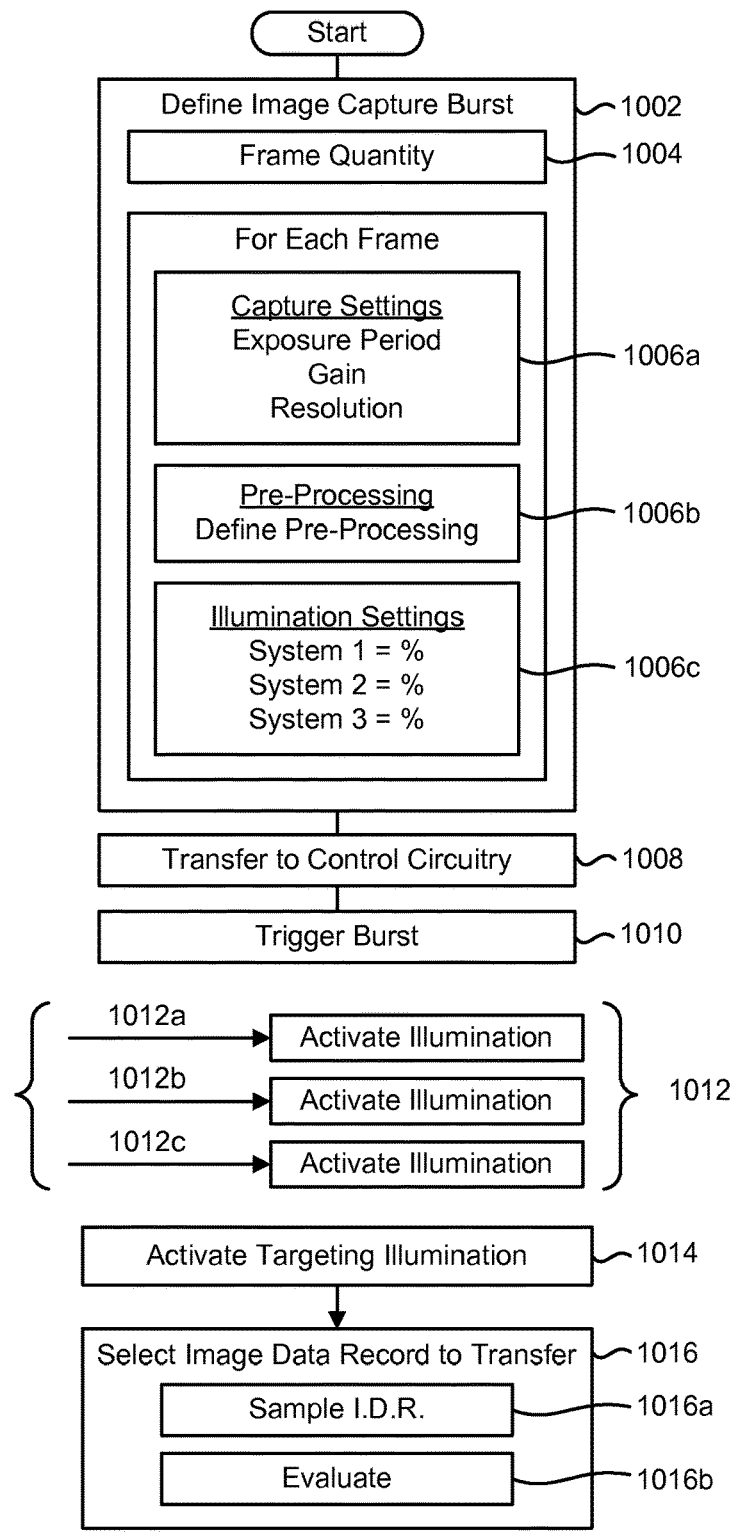
FIG. 10 illustrates an example of a method for selecting an image data record in accordance with one embodiment.

Referring to FIG. 10 in conjunction with FIGS. 9A-9C, an exemplary operation of certain components of the barcode reader 10 are represented in accordance with an embodiment of the present invention.

Step 1002 represents defining image capture parameter values for a burst of image frames to capture. In more detail, defining the image capture parameter values may comprise the image capture module 962 or the decoder module 980 defining the quantity of image frames to capture (full, binned, sub-sampled, and/or windowed) in sequence at sub-step 1004 and for each frame in the sequence, defining: i) image capture parameter values for the image frame such as the exposure period, gain settings, and/or resolution settings (if capturing a binned or sub-sampled image frame) at sub-step 1006a; ii) the image processing functions to which the image frame will be subject by pre-processing circuits 965a-n for purposes of defining the image data records 967a-n to be written to the image buffer 963 at sub-step 1006b; and/or iii) the illumination settings for the image frame at sub-step 1006c.

The illumination settings may be defined as a combination of: i) identifying which illumination sub-systems 930a-c are to be used for capturing the image frame and ii) for each illumination sub-system 930a-c, the percentage of full intensity at which the illumination is to be activated.

More specifically, the status of each illumination sub-system 930a, 930b, 930c (i.e., active or non-active and, if active, the intensity level) may be different for each image frame captured. For example, when two sequential frames are captured, the first frame may be captured with only illumination sub-system 930a active while the second frame may be captured with only illumination sub-system 930b active.

Further, the selection of image capture parameter values, including the non-active and active illumination sub-systems 930a, 930b, 930c for capturing images, may be based on characteristics of the image data records 967a-n in the image buffer 963 or image data records 953a-n in the buffer memory 970 from previously captured image frames.

Step 1008 represents: i) transferring the image capture parameter values for the image capture burst to the control circuitry 939 of the image sensor system package 111 utilizing the bi-directional control link 202 of the interface 200; and ii) configuring the illumination logic to drive the applicable illumination sub-system 930a-c in accordance with the illumination parameters during an exposure time for capture of each image frame. It should be appreciated that image capture parameter values transferred to the control circuitry 939 do not need to include parameter values related to illumination when illumination is controlled by hardware logic 954 within the image capture system package 107. However, in an embodiment wherein the illumination logic 954 controlling illumination sub-systems 930a-n is within the image sensor system package 111 (not shown on FIG. 9a) then illumination parameter values would be transferred to the control circuitry 939.

Step 1010 represents driving the single trigger signal to the control circuitry 939 to initiate capture of the burst of one or more image frames, and subsequent image pre-processing and writing of image data records 967a-n to the image buffer 963 which, as discussed may be without further control by the image capture system package 107.

Step 1012 represents the illumination logic 954 receiving from the control circuitry 939 of the image sensor system package 111, for each image frame of the burst, a flash signal 1012a-c indicative of the exposure period commencement and termination for the image frame and activating the illumination system 103 in accordance with the illumination settings applicable to that image frame as defined at step 1006c.

Step 1014 represents activating targeting illumination after capturing the burst of image frames for purposes of projecting a targeting pattern of illumination into the field of view to assist the operator of the barcode reader in maintaining the desired barcode within the field of view 106 of the barcode reader in case an additional burst of one or more image frames is required. After the barcode within the field of view 106 has been decoded the targeting illumination may be deactivated.

Step 1016 represents selecting which image data records 967a-n (or selected portions or windows within each image data record 967a-n) are to be transferred from the image buffer 963 to the image capture control and decode system 107. More specifically, the decoder 980 or the image capture module 962 may obtain portions (e.g., samples) of one or more image data records 967a-n at sub-step 1016a and evaluate each for the quality of the image of the barcode within the image data record at sub-step 1016b to select one or more image data records 967a-n, but fewer than all image data records 967a-n, to transfer from the image buffer 963 to the image capture control and decode system 107 for decoding.

The image data records 967a-n being transferred may have the best quality image of the barcode or other characteristics of the image of the barcode which are likely to result in a decodable barcode image. For example, the quality of an image of a barcode may be measured in terms of the contrast between light cells and dark cells within the barcode. A barcode image having relatively high contrast between dark cells and light cells may be considered to have higher quality than a barcode image having relatively low contrast between dark cells and light cells.

The superior contrast profile may mean at least one of: (i) greater maximum amplitude between the portions of the image within the subset that are dark marks of the barcode and the portions of the image within the subset that are light marks of the barcode; and (ii) more distinct transitions between portions of the image within the subset that are dark marks of the barcode and the portions of the image within the subset that are light marks of the barcode.

The terms "dark cells" and "light cells" are used herein because barcodes have traditionally been printed with ink. This gives barcodes the appearance of having dark cells (the portion that is printed with ink) and light cells (the unprinted substrate background, typically white). However, with direct part mark technology, ink is not always used and other techniques (e.g., laser/chemical etching and/or dot peening) may be used instead. Such techniques may be utilized to create a barcode by causing different portions of a substrate to have different reflective characteristics. When these different portions of the substrate are imaged, the resulting barcode image may have the appearance of including dark cells and light cells. Therefore, as used herein, the terms "dark cells" and "light cells" should be interpreted as applying to barcodes that are printed with ink as well as barcodes that are created using other technologies.

The contrast between the dark cells and the light cells in a barcode may be a function of illumination. Ideally, it is desirable to provide illumination that is consistent across the barcode and of intensity such that the exposure of the image yields both dark cells and light cells that are within the dynamic range of the photo sensor array 102. This yields better contrast than any of the following: (i) a dimly lit barcode; (ii) a brightly lit barcode wherein the image is washed out beyond the dynamic range of the photo sensor array 102; (iii) an unevenly lit barcode with bright washed out spots; or (iv) a barcode illuminated with illumination that is not compatible with the reflectivity characteristic(s) of the cells of the barcode. An example of (iv) is that illumination directed from the sides of the field of view yields a higher contrast image of a barcode formed by etching technology than does illumination parallel to the optical axis.

If the quality of a window of images is measured in terms of contrast, determining the selected illumination system configuration may include determining which window image of the plurality of window images has the highest contrast between light and dark cells of the barcode, and determining which configuration of the plurality of illumination systems 930a-c was activated when the window image having the highest contrast was captured.

In one embodiment, each of the image data records 967a-n which are transferred to the image capture control and decode system 107 may be written to the image buffer 970 as image data records 953a-n without further image processing. In another embodiment, the image pre-processing circuits 951a-n may perform image processing and writing of resulting image data records 953a-n to the buffer memory 970 as previously discussed.

Also, as previously discussed, one of the pre-processing circuits 965a-n may simply write input data as an image data record 967a-n to the image buffer 963 without additional substantive processing.

As such, the structure depicted in FIG. 9A and FIG. 9B enables an image frame, as captured by the photo sensor array 102, to be written as an image data record 967 to image buffer 963 without substantive processing then subsequently transferred to the image capture control and decode system 107 where it either: i) undergoes image pre-processing by one or more pre-processing circuits 951a-n, resulting in one or more image data records 953a-n being written to the image buffer 970 as a result of such pre-processing; or ii) is written to the image buffer 970 as an image data record 953a-n without pre-processing by either the pre-processing circuits 965a-n or the pre-processing circuits 951a-n.

The structure depicted in FIG. 9A and FIG. 9B also enables an image frame, as captured by the photo sensor array 102, to undergo image pre-processing utilizing one or more pre-processing circuits 965a-n and to be written to the image buffer 963 as one or more image data records 967a-n and then have one or more of the image data records 967a-n transferred to the image capture control and decode system 107 where the transferred image data records 967a-n are: i) written to the image buffer 970 as image data records 953a-n without further pre-processing; or ii) subjected to further pre-processing by image pre-processing circuits 951a-n, resulting in writing of image data records 953a-n to the image buffer 970.

Further, as discussed, processing module 979 may undertake processing of one or more image data records 953a-n to modify the image data records and/or generate additional, or replacement, image data records from one or more image data records 953a-n. As such, any image data record 953a-n may be processed by the image processing module 979 prior to being subjected to decoding, whether it is: i) representative of the image frame captured by the photo sensor array 102 without substantive processing by either the pre-processing circuits 965a-n or the pre-processing circuits 951a-n; ii) pre-processed by one of the pre-processing circuits 965a-n but without further substantive pre-processing by one of the pre-processing circuits 951a-n; iii) not substantively processed by one of the pre-processing circuits 965a-n but substantively pre-processed by one of the pre-processing circuits 951a-n; or iv) substantively pre-processed by both one of the pre-processing circuits 965a-n and one of the pre-processing circuits 951a-n.

Preprocessing

Examples of pre-processing will be explained hereafter. The following examples of pre-processing may be: i) performed by the pre-processing circuits 965a-n on a frame of image data received from the photo sensor array 102 to generate image data records 967a-n, which are the image frame or a derivative of the image frame, to be written to the image buffer 963; ii) performed by the pre-processing circuits 951a-n and/or the image processing module 979 (executed by the processor 948) on an image data record 967a-n transferred from the image buffer 963 to the image capture control and decode system 107 for generating an image data record 953a-n which may be the original image frame or a derivative of the original image frame.

Preprocessing Example A

In one embodiment, no image processing may be performed such that the image data record may be the image frame (whether full, windowed, binned, or sub-sampled) without substantive processing.

Preprocessing Example B

In another embodiment, portions of the image frame may be cropped horizontally or vertically such that the image data record may be a windowed portion of the image frame (whether full, binned or sub-sampled).

Preprocessing Example C

In another embodiment, the image data record may be a lower resolution frame of the original image data. One of the pre-processing circuits may bin, or average, two or more pixel intensity values to generate a single intensity value representative of a theoretical pixel that encompasses the size of all of the pixels that provided values that were binned or averaged. Multiple image data records can be generated from the same frame of image data at different resolutions. Referring to FIG. 12A: i) 220 represents binning four pixels (e.g., averaging the four intensity values) to reduce the resolution to 25% of the resolution of the input image; ii) 222 represents vertical binning of two pixels to reduce vertical resolution by 50% without affecting horizontal resolution; and iii) 224 represents horizontal binning of two pixels to reduce horizontal resolution by 50% without affecting vertical resolution. It should be noted that FIG. 12A shows examples only and the binning may include any other grouping of pixels for resolution reduction.

Preprocessing Example D

In another embodiment, binarization may be performed. The binarization may involve comparing the intensity value of each pixel, or the intensity value resulting from the binning of a group of pixels, to a threshold. If it is greater than (or equal to) the threshold, the intensity value may be converted to a first binary value, and if it is less than (or equal to) the threshold, the intensity value may be converted to a second binary value. The threshold may be common across all pixels (or binned pixel groupings) or may be different for different pixels (or binned pixel groupings). The threshold value applied to any pixel (or binned pixel groupings) may be dynamic (e.g., the threshold value may be calculated based on the intensity values previously operated on during the binarization process).

Preprocessing Example E

In another embodiment, a minimum/maximum processing technique may be applied to any array of pixel intensity values or any array of binned or subsampled array of intensity values. It may be applied across the entire frame of image data (or an image data record) or to only a cropped section of the frame of image data (or an image data record). Referring to FIG. 12B, an exemplary 3×3 kernel 230 encompasses 9 pixel intensity values (or 9 binned intensity values). Of those 9 intensity values, the maximum intensity value or the minimum intensity value is determined and written to the image data record in substitution for the intensity value of the center value 234 for kernel 230. The kernel is then shifted to the next center value 236 (represented by kernel 232, which is shown shifted up slightly for clarity) and the maximum or minimum value among the nine intensity values is calculated for replacement of intensity value 236.

Preprocessing Example F

In another embodiment, convolution kernel masking may be performed. In this image processing technique, a kernel mask, such as the 3×3 kernel mask 240 as shown in FIG. 12C as an example, may be applied to a 3×3 group of pixel intensity values (or a 3×3 group of binned intensity values) to determine an intensity value to replace the center intensity value. More specifically, each intensity value is multiplied by the mask value (in the example of FIG. 12C, the center intensity value is multiplied by 8 and each surrounding intensity value is multiplied by −1) and then the resulting 9 values are averaged to determine the intensity value to replace the center intensity value. The kernel is then shifted by one pixel as described with respect to FIG. 12B to determine the intensity value for the next pixel.

Preprocessing Example G

Figure 12D:
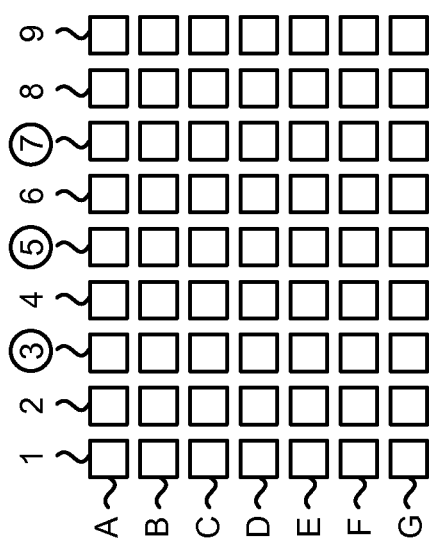

In another embodiment, a rotation may be performed as shown in FIG. 12D on an array of pixel values. More specifically, each intensity value for selected columns of the array (e.g. 3, 5, 7) may be extracted and used for intensity values of adjacent rows within an image data record. The selected columns may be adjacent columns or may be a fraction of the columns, evenly spaced, across all or a portion of the array. The array may be the image data (full, binned, sub-sampled, and/or windowed).

It should be appreciated that using one or more of the above processing techniques, image data records can be generated from the original image frame or image data records that have already been generated from the original image frame. Multiple processing techniques may be applied to the same frame of image data (or image data record) to result in different image data records derived therefrom, and the processing techniques may be applied in any order.

Sets of image data records may be generated from one or more image frames captured in a single sequence or in multiple sequences, and may be generated by a combination of the pre-processing circuits 965a-n of the image sensor system package 111, pre-processing circuits 951a-n of the image capture control and decode system 107, and/or the processor 148 of the image capture control and decode system 107 executing the image processing module 979. For example, an image data record may be a frame of image data which may be an array of pixel intensity values, each pixel intensity value representing the intensity of illumination accumulating on the photo sensor pixel over the exposure period. Different image data records may each be a frame of image data captured using a different exposure period as shown in FIG. 13A, using a different gain setting, or using a different exposure illumination active during a different exposure period as shown in FIG. 13B. FIG. 13A shows, as an example, three image frames generated by using different exposure settings, respectively. FIG. 13B shows, as an example, four image frames that are generated using different illumination systems and different exposure settings. Only one of the illumination systems 930a, 930b, 930c may be active during the exposure period for a first image data record while a different one of the illumination systems 930a, 930b, 930c may be active during the exposure period for a second image data record.

Further, although not shown in FIG. 13B, multiple illumination systems may be active for an exposure period, at intensities that may be different. For example, during a first exposure period a first illumination system 930a may be active at 10% power and a second illumination system 930b may be active at 60% power and, during a second exposure period the first illumination system may be active at 30% power while the second illumination system may be active at 20% power.

As used herein, the phrase "substantially parallel" means within five degrees of parallel. In another embodiment, substantially parallel means within 15 degrees of parallel. In another embodiment, substantially parallel means within 20 degrees of parallel.

As used herein, the phrase "substantially perpendicular" means within five degrees of perpendicular. In another embodiment, substantially perpendicular means within 15 degrees of perpendicular. In another embodiment, substantially perpendicular means within 20 degrees of perpendicular.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

As used herein, the phrase "based on" does not mean "based only on," unless expressly specified otherwise. In other words, the phrase "based on" describes both "based only on" and "based at least on."

One or more of the features, functions, procedures, operations, components, elements, structures, etc., described in connection with any one of the configurations described herein may be combined with one or more of the functions, procedures, operations, components, elements, structures, etc., described in connection with any of the other configurations described herein, where compatible.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The claims are not limited to the specific implementations described above. Various modifications, changes and variations may be made in the arrangement, operation and details of the implementations described herein without departing from the scope of the claims.

What is claimed is:

1. A barcode reader, comprising:
   a lens for focusing an image of a barcode onto a two-dimensional array of photosensitive diodes;
   image read-out circuitry coupled to the two-dimensional array of photosensitive diodes and configured to generate a frame of image data, wherein the frame of image data is a sequence of values, each value representing intensity of illumination focused onto one photosensitive diode of the two-dimensional array of photosensitive diodes;
   image processing circuitry configured to receive the sequence of values of the frame of image data and perform at least two image processing functions to generate at least two distinct image data records from the frame of image data, the image processing circuitry comprising a plurality of image processing circuits implemented in hardware, the at least two image processing functions being performed by at least two different image processing circuits, each image data record being a derivative of the frame of image data and representing the image of the barcode;
   non-transient computer readable media for storing the at least two distinct image data records; and
   a processor configured to determine which of the at least two distinct image data records to decode and decode a selected image data record, wherein the selected image data record is an image data record from the at least two distinct image data records the processor determined to decode;
   wherein the at least two different image processing circuits are configured to generate and store the at least two distinct image data records during an amount of time that the frame of image data is received.

2. The barcode reader of claim 1, wherein the processor is configured to determine which of the at least two distinct image data records to decode by analyzing a portion of each image data record representing the image of the barcode, wherein the portion representing the image of the barcode includes at least one dark mark and at least one light mark, and determining to decode the image data record with a superior contrast profile as between parts of the portion of the image data record that are dark marks and parts of the portion of the image data record that are light marks.

3. The barcode reader of claim 2, wherein each of the at least two distinct image data records is generated by applying at least two distinct image processing convolution kernels to one of: i) the frame of image data; and ii) a reduced resolution image resulting from reducing resolution of the frame of image data by sub-sampling or binning.

4. The barcode reader of claim 2, wherein the superior contrast profile means at least one of: (i) a greater maximum amplitude between portions of an image within a subset that are dark marks of the barcode and portions of the image within the subset that are light marks of the barcode; and (ii) more distinct transitions between the portions of the image within the subset that are dark marks of the barcode and portions of the image within the subset that are light marks of the barcode.

5. The barcode reader of claim 1, wherein the processor is configured to determine which of the at least two distinct image data records to decode by:
   extracting, from each of the image data records, a subset of the image data record that represents the image of the barcode, wherein the subset includes at least one dark mark and at least one light mark; and
   analyzing each subset of the image data record and selecting a subset with a superior contrast profile as between parts of the subset of the image data record that are dark marks and parts of the subset of the image data record that are light marks;
   wherein the selected image data record is the image data record from which the selected subset is extracted.

6. The barcode reader of claim 5, wherein the superior contrast profile means at least one of: (i) a greater maximum amplitude between portions of an image within a subset that are dark marks of the barcode and portions of the image within the subset that are light marks of the barcode; and (ii) more distinct transitions between the portions of the image within the subset that are dark marks of the barcode and the portions of the image within the subset that are light marks of the barcode.

7. The barcode reader of claim 1, wherein the two-dimensional array of photosensitive diodes and the image read-out circuitry are within a first system package, and the image processing circuitry, the non-transient computer readable media, and the processor are within a second system package.

8. The barcode reader of claim 1, wherein the two-dimensional array of photosensitive diodes, the image read-out circuitry, the image processing circuitry, and the non-transient computer readable media are within a first system package, and the processor is within a second system package.

9. The barcode reader of claim 8, wherein the processor is configured to decode the selected image data record by transferring at least a portion of the selected image data record to second non-transient computer readable media associated with the second system package.

10. The barcode reader of claim 8, wherein the processor is configured to decode the selected image data record directly from the non-transient computer readable media in the first system package.

11. A barcode reader, comprising:
    a camera system for generating a frame of image data comprising an image of a barcode within a field of view of the camera system;
    an image processing system for receiving the frame of image data and generating at least two distinct image data records, each of the at least two distinct image data records being a derivative of the frame of image data and representing the image of the barcode, the image processing system generating the at least two distinct image data records using at least two different image processing circuits implemented in hardware;
    non-transient computer readable media for storing the at least two distinct image data records; and
    a processor configured to determine which of the at least two distinct image data records to decode and decode a selected image data record, wherein the selected image data record is an image data record from the at least two distinct image data records the processor determined to decode;
    wherein the at least two different image processing circuits are configured to generate and store the at least two distinct image data records during an amount of time that the frame of image data is received.

12. The barcode reader of claim 11, wherein each of the at least two distinct image data records is generated by applying at least two distinct image processing convolution kernels to one of: i) the frame of image data; and ii) a reduced resolution image resulting from reducing resolution of the frame of image data by sub-sampling or binning.

13. The barcode reader of claim 11, wherein the processor is configured to determine which of the at least two distinct image data records to decode by:
   extracting, from each of the at least two distinct image data records, subsets of the image data record that represent the image of the barcode, wherein the subset of the image data record that represents the image of the barcode includes at least one dark mark and at least one light mark; and
   analyzing each subset of the image data record and selecting a subset with a superior contrast profile as between parts of the subset of the image data record that are dark marks and parts of the subset of the image data record that are light marks;
   wherein the selected image data record is the image data record from which the selected subset is extracted.

14. The barcode reader of claim 13, wherein the superior contrast profile means at least one of: (i) a greater maximum amplitude between portions of an image within a subset that are dark marks of the barcode and portions of the image within the subset that are light marks of the barcode; and (ii) more distinct transitions between the portions of the image within the subset that are dark marks of the barcode and the portions of the image within the subset that are light marks of the barcode.

15. The barcode reader of claim 11, wherein the camera system is within a first system package, and the image processing system, the non-transient computer readable media, and the processor are within a second system package.

16. The barcode reader of claim 11, wherein the camera system, the image processing system, and the non-transient computer readable media are within a first system package, and the processor is within a second system package.

17. The barcode reader of claim 16, wherein the processor is configured to decode the selected image data record by transferring at least a portion of the selected image data record to a second non-transient computer readable medium associated with the second system package.

18. The barcode reader of claim 16, wherein the processor is configured to decode the selected image data record directly from the non-transient computer readable media in the first system package.

19. The barcode reader of claim 11, wherein the processor is configured to determine which of the at least two distinct image data records to decode by analyzing a portion of each image data record representing the image of the barcode, wherein the portion representing the image of the barcode includes at least one dark mark and at least one light mark, and determining to decode the image data record with a superior contrast profile as between parts of the portion of the image data record that are dark marks and parts of the portion of the image data record that are light marks.

20. The barcode reader of claim 19, wherein the superior contrast profile means at least one of: (i) a greater maximum amplitude between portions of an image within a subset that are dark marks of the barcode and portions of the image within the subset that are light marks of the barcode; and (ii) more distinct transitions between the portions of the image within the subset that are dark marks of the barcode and the portions of the image within the subset that are light marks of the barcode.

21. A method of reading a barcode with a barcode reader, the method comprising:
   using an image sensor to capture a frame of image data, the frame of image data comprising an image of the barcode within a field of view of a camera system of the barcode reader;
   using hardware gate logic to:
      apply at least two distinct image processing functions to the frame of image data to generate at least two distinct image data records from the frame of image data, each representing the image of the barcode, wherein the at least two distinct image processing functions are applied using at least two different image processing circuits; and
      store the at least two distinct image data records in non-transient computer readable media; and
   using a processor to:
      determine which of the at least two distinct image data records to decode; and
      decode a selected image data record, wherein the selected image data record is an image data record from the at least two distinct image data records the processor determined to decode;
   wherein the hardware gate logic is configured to generate and store the at least two distinct image data records during an amount of time that the frame of image data is received.

22. The method of claim 21, wherein each of the at least two distinct image data records is generated by applying one of at least two distinct image processing convolution kernels to at least two of: i) the frame of image data; ii) a reduced resolution image resulting from reducing resolution of the frame of image data by sub-sampling or binning; and iii) a convolution of the frame of image data generated by applying a first convolution kernel, different than the at least two distinct image processing convolution kernels, to the frame of image data.

23. The method of claim 21, wherein each of the at least two distinct image data records is generated by applying at least two distinct image processing convolution kernels to one of: i) the frame of image data; and ii) a reduced resolution image resulting from reducing resolution of the frame of image data by sub-sampling or binning.

24. The method of claim 21, wherein the selected image data record is determined by:
   extracting, from each of the image data records, a subset of the image data record that represents the image of the barcode, wherein the subset of the image data record that represents the image of the barcode includes at least one dark mark and at least one light mark; and
   analyzing each subset of the image data record and selecting a subset with a superior contrast profile as between parts of the subset of the image data record that are dark marks and parts of the subset of the image data record that are light marks;
   wherein the selected image data record is the image data record from which the selected subset is extracted.

25. The method of claim 24, wherein the superior contrast profile means at least one of: (i) a greater maximum amplitude between portions of an image within a subset that are dark marks of the barcode and portions of the image within the subset that are light marks of the barcode; and (ii) more distinct transitions between the portions of the image within the subset that are dark marks of the barcode and the portions of the image within the subset that are light marks of the barcode.

26. The method of claim 21, wherein using the processor to determine which of the at least two distinct image data records to decode comprises analyzing a portion of each image data record representing the image of the barcode, wherein the portion representing the image of the barcode includes at least one dark mark and at least one light mark, and determining to decode the image data record with a superior contrast profile as between parts of the portion of the image data record that are dark marks and parts of the portion of the image data record that are light marks.

27. The method of claim 26, wherein the superior contrast profile means at least one of: (i) a greater maximum amplitude between portions of an image within a subset that are dark marks of the barcode and portions of the image within the subset that are light marks of the barcode; and (ii) more distinct transitions between the portions of the image within the subset that are dark marks of the barcode and the portions of the image within the subset that are light marks of the barcode.

\* \* \* \* \*